US012632206B2

(12) United States Patent
Kim et al.

(10) Patent No.: US 12,632,206 B2
(45) Date of Patent: May 19, 2026

(54) DISPLAY DEVICE HAVING MULTICHANNEL LENS, AND WEARABLE DEVICE INCLUDING THE SAME

(71) Applicant: Samsung Display Co., LTD., Yongin-si (KR)

(72) Inventors: Sang Ho Kim, Yongin-si (KR); Soo Min Baek, Yongin-si (KR); Ju Youn Son, Yongin-si (KR); Ji Won Lee, Yongin-si (KR); Cheon Myeong Lee, Yongin-si (KR); Bek Hyun Lim, Yongin-si (KR); Ju Hwa Ha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/464,305

(22) Filed: Sep. 11, 2023

(65) Prior Publication Data

US 2024/0168694 A1 May 23, 2024

(30) Foreign Application Priority Data

Nov. 17, 2022 (KR) ........................ 10-2022-0154087

(51) Int. Cl.
*G06F 3/14* (2006.01)
*G02B 1/10* (2015.01)
*G02B 27/01* (2006.01)

(52) U.S. Cl.
CPC ............. *G06F 3/1446* (2013.01); *G02B 1/10* (2013.01); *G02B 27/0172* (2013.01)

(58) Field of Classification Search
CPC .... G06F 1/1637; G06F 1/1647; G06F 3/1446; G09G 3/007; G09G 2320/0209; G06T 3/4038; G02B 1/10; G02B 27/017–0179; G02B 27/0955–0961; G02B 27/0977; G02B 27/1066; H04N 13/156–167; H04N 13/332–354
See application file for complete search history.

(56) References Cited

U.S. PATENT DOCUMENTS 9,380,287 B2 6/2016 Nistico et al.
10,607,075 B2 3/2020 Gustafsson et al.
(Continued)

FOREIGN PATENT DOCUMENTS

CN 104932105 9/2015
KR 10-1455714 11/2014
(Continued)

*Primary Examiner* — Keith L Crawley
(74) *Attorney, Agent, or Firm* — CANTOR COLBURN LLP

(57) ABSTRACT

A display device and a wearable device. The display device may include at least one display panel comprising multiple subsidiary display panels, wherein images output from the subsidiary panels are extended to one another to form a single screen image and at least one multi-channel lens including multiple subsidiary lenses to provide multiple channels for light incident onto the subsidiary lenses, respectively, wherein the subsidiary display panels are associated with the subsidiary lenses, respectively, and the subsidiary display panels are inclined at a first angle from a reference plane so that their front surfaces face the respective subsidiary lenses.

21 Claims, 20 Drawing Sheets

DP1 : DP11, DP14
LS1 : LS11, LS14

(56)                    References Cited

U.S. PATENT DOCUMENTS

| | | | |
|---|---|---|---|
| 2009/0128919 A1* | 5/2009 | Kim | G02B 27/0172 |
| | | | 359/630 |
| 2013/0187836 A1 | 7/2013 | Cheng et al. | |
| 2017/0153662 A1 | 6/2017 | Tsai et al. | |
| 2017/0171533 A1* | 6/2017 | Benitez | G02B 3/0037 |
| 2018/0003862 A1* | 1/2018 | Benitez | G02B 30/24 |
| 2018/0003999 A1* | 1/2018 | Minano | G02B 17/086 |
| 2018/0157453 A1* | 6/2018 | Yang | G02B 5/04 |
| 2018/0288403 A1* | 10/2018 | Cole | H04N 13/344 |
| 2018/0321498 A1* | 11/2018 | Chiu | G02B 27/0172 |
| 2018/0348520 A1 | 12/2018 | Chiu et al. | |
| 2019/0086675 A1* | 3/2019 | Carollo | G02B 27/288 |
| 2021/0055560 A1* | 2/2021 | Benitez | G02B 5/26 |
| 2021/0373339 A1* | 12/2021 | Zhou | G02B 3/0037 |
| 2022/0050296 A1* | 2/2022 | You | G02B 27/0172 |
| 2023/0221556 A1* | 7/2023 | Benitez | G02B 27/0172 |
| | | | 359/741 |

FOREIGN PATENT DOCUMENTS

| | | |
|---|---|---|
| KR | 10-2219245 | 2/2021 |
| WO | 2015/077718 | 5/2015 |

* cited by examiner

LS1: LS11, LS12, LS13, LS14
LS2: LS21, LS22, LS23, LS24

LS1

DP1 : DP11, DP12, DP13, DP14
DP2 : DP21, DP22, DP23, DP24

DP_IMG

VA2  DP12_IMG

DP11_IMG VA1

DP12

W2

DP11

W1

DP13

W3

W4

DP14

VA3 DP13_IMG

DP14_IMG  VA4

IMG_V

LS1 : LS11, LS14

DP1 : DP11, DP14
LS1 : LS11, LS14

DP1 : DP11, DP14
LS1 : LS11, LS14

DP' : DP1', DP2'
10' : DP', LS1', LS2'

DP1' : DS11, DS12, DS13, DS14
DP2' : DS21, DS22, DS23, DS24

DP1' : DS11, DS14
LS1' : LS11', LS14'

DP1' : DS11, DS14
LS1' : LS11', LS14'

DISPLAY DEVICE HAVING MULTICHANNEL LENS, AND WEARABLE DEVICE INCLUDING THE SAME

CROSS-REFERENCE TO RELATED APPLICATIONS

This application claims priority under 35 U.S.C. § 119 from Korean Patent Application No. 10-2022-0154087 filed on Nov. 17, 2022 in the Korean Intellectual Property Office, the entire contents of which are incorporated herein by reference.

BACKGROUND

1. Technical Field

The disclosure relates to a display device and a wearable device including the same.

2. Description of the Related Art

Display devices become more and more important as multimedia technology evolves. Accordingly, a variety of types of display devices such as liquid-crystal display (LCD) devices and organic light-emitting display (OLED) devices are currently used.

Among display devices, there may be electronic devices that can be worn on a person's body. Such electronic devices may be typically referred to as wearable devices. A wearable electronic device can be worn on (i.e., directly on) a person's body, and thus portability and user accessibility can be improved.

An example of such wearable electronic devices may include a head mounted display (head mounted electronic device) that can be mounted on a person's head. Head mounted displays (HMD) may be roughly sorted into a see-through head mounted display which provides augmented reality (AR) and a see-closed head mounted display which provides virtual reality (VR).

SUMMARY

Aspects of the disclosure provide a display device that can prevent image display defects and can improve image display quality, and a wearable device including the same. However, aspects of the disclosure may not be restricted to the one set forth herein. The above and other aspects of the disclosure will become more apparent to one of ordinary skill in the art to which the disclosure pertains by referencing the detailed description of the disclosure given below.

According to an embodiment, a display device may include at least one display panel that may include a plurality of subsidiary display panels, wherein image display light output from the subsidiary panels may be extended to one another to form a single screen image, and at least one multi-channel lens that may include a plurality of subsidiary lenses that provide a corresponding plurality of channels through which the image display light output from the plurality of subsidiary display panels may pass, respectively, wherein the subsidiary display panels may be associated with the subsidiary lenses, respectively, and the subsidiary display panels may be inclined at a first angle with respect to a reference plane so that front surfaces of the plurality of subsidiary display panels face the respective subsidiary lenses.

The reference plane may be a horizontal plane perpendicular to an optical axis of the at least one multi-channel lens.

The subsidiary display panels may be disposed to face rear surfaces of the respective subsidiary lenses, and emit the image display light toward the rear surfaces of the subsidiary lenses so that an angle of a chief ray may be about 0 degrees.

A front surface of each of the plurality of subsidiary lenses may include a mirror-coated part on which a reflective material may be disposed.

The at least one multi-channel lens may include a concaved portion at a center of the at least one multi-channel lens, and the concaved portion may include an inner coated part where the reflective material may be disposed.

The mirror-coated part may reflect the image display light output from each of the plurality of subsidiary display panels towards the inner coated part.

The inner coated part may reflect the image display light reflected from the mirror-coated part in a direction of an optical axis of the lens.

Ones of the subsidiary lenses may be spaced apart from one another.

Each of the subsidiary display panels may overlap a corresponding mirror-coated part.

The at least one multi-channel lens may include a first multi-channel lens and a second multi-channel lens disposed in line with a first display panel and a second display panel, respectively, and the first and the second multi-channel lenses may pass the image display light output from the first display panel and the second display panel respectively through different paths corresponding to the plurality of channels to transmit the image display light to a user's eyes through the plurality of channels having different paths.

The at least one display panel may include the first display panel and the second display panel disposed at positions of the user's left and right eyes, respectively.

According to an embodiment, a display device may include at least one display panel that may include a plurality of display surfaces disposed on different planes, wherein image display light output from the display surfaces may be connected with one another to form a single screen image, and at least one multi-channel lens that may include a plurality of subsidiary lenses that provide a corresponding plurality of channels through which the image display light output from the plurality of display surfaces may pass, respectively, wherein the display surfaces may be associated with the subsidiary lenses, respectively, and the display surfaces may be inclined at a first angle with respect to a reference plane to face the respective subsidiary lenses.

The reference plane may be a horizontal plane perpendicular to an optical axis of the at least one multi-channel lens.

The display panel may have a frustum shape, and the display surfaces may be disposed on side surfaces of the frustum.

The display surfaces may be disposed such to face rear surfaces of the respective subsidiary lenses, and emit image display light toward the rear surfaces of the subsidiary lenses so that an angle of a chief ray may be about 0 degrees.

A front surface of each of the plurality of subsidiary lenses may include a mirror-coated part on which a reflective material may be disposed.

The at least one multi-channel lens may include a concaved portion at a center of the at least one multi-channel lens, and the concaved portion may include an inner coated part where the reflective material may be disposed.

The mirror-coated part may reflect the image display light output from each of the subsidiary display panels to the inner coated part, and the inner coated part may reflect the image display light reflected from the mirror-coated part in a direction of an optical axis of the lens.

Each of the display surfaces may overlap a corresponding mirror-coated part.

According to an embodiment, a wearable device may include a main frame mounted on a user's body, a display device mounted on the main frame to display an image and a cover frame covering the display device, wherein the display device may include at least one display panel that may include a plurality of subsidiary display panels, wherein image display light output from the subsidiary panels may be extended to one another to form a single screen image, and at least one multi-channel lens that may include a plurality of subsidiary lenses that provide a corresponding plurality of channels through which the image display light output from the plurality of subsidiary display panels may pass, respectively, the subsidiary display panels may be associated with the subsidiary lenses, respectively, and the subsidiary display panels may be inclined at a first angle with respect to a reference plane so that display surfaces of the plurality of subsidiary display panels face the respective subsidiary lenses.

According to an embodiment, a wearable device may include a main frame mounted on a user's body, a display device mounted on the main frame to display an image and a cover frame covering the display device, wherein the display device may include at least one display panel that may include a plurality of display surfaces disposed on different planes, wherein image display light output from the display surfaces may be connected with one another to form a single screen image, and at least one multi-channel lens may include a plurality of subsidiary lenses that provide a corresponding plurality of channels through which the image display light output from the plurality of display surfaces may pass, respectively, the display surfaces may be associated with the subsidiary lenses, respectively, and the display surfaces may be inclined at a first angle with respect to a reference plane so that they face the respective subsidiary lenses.

According to an embodiment of the disclosure, image display defects such as a ghost image in a display device can be prevented, so that the user satisfaction and the device reliability can be improved. However, the effects of the disclosure may not be limited to the aforementioned effects, and various other effects are included in the specification.

BRIEF DESCRIPTION OF THE DRAWINGS

An additional appreciation according to the embodiments of the disclosure will become more apparent by describing in detail the embodiments thereof with reference to the accompanying drawings, wherein.

DETAILED DESCRIPTION OF THE EMBODIMENTS

Figure 1:
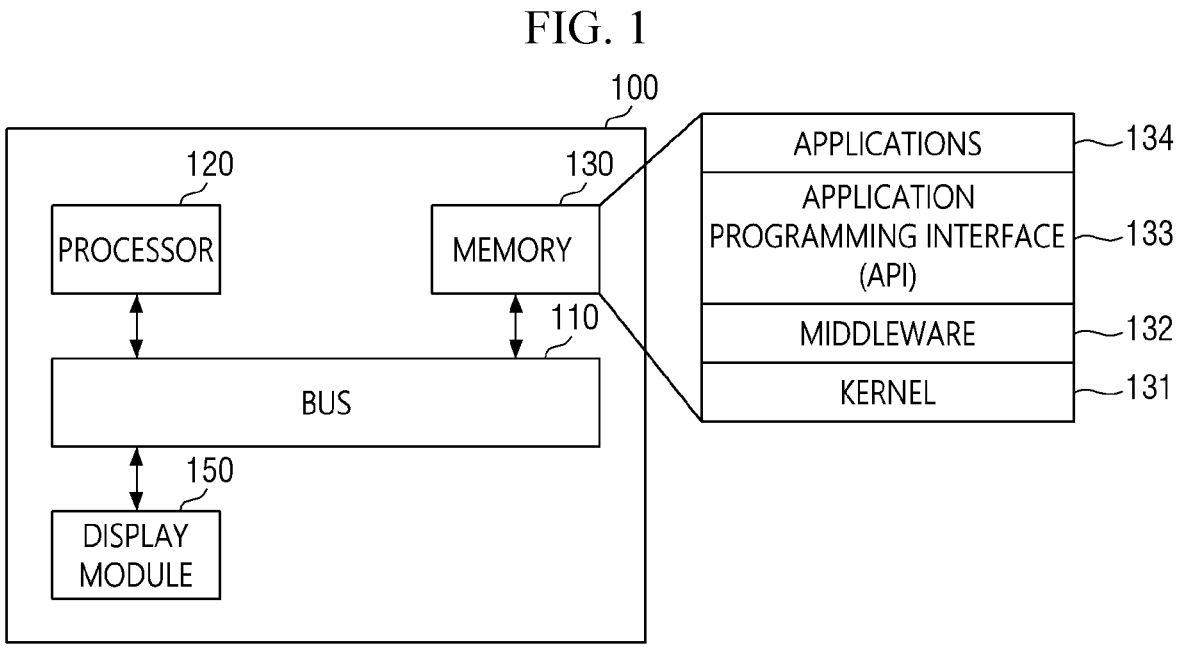
FIG. 1 is a schematic block diagram showing a display device according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be predisposed differently from the described order. For example, two consecutively described processes may be predisposed substantially at the same time or predisposed in an order opposite to the described order. Also, like reference numerals and/or reference characters denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be disposed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein. Hereinafter, embodiments of the disclosure will be described in detail with reference to the accompanying drawings.

FIG. 1 is a schematic block diagram showing a display device according to an embodiment of the disclosure. Referring to FIG. 1, a display device 100 may include a bus 110, a processor 120, a memory 130, and a display module or display unit 150. The bus 110 may be a circuit that electrically connects the above-mentioned elements to one another and transfers communications (e.g., a control message) between the elements.

The processor 120 may receive, for example, a request, data, or a signal from the above-mentioned elements (e.g., the memory 130, an input/output interface, or the display module 150, etc.) through the bus 110, and may control the elements by processing calculations or data accordingly. The processor 120 may process at least part of the information obtained from other elements (e.g., the memory 130, the display module 150, etc.) and provide it to a user in a variety of ways. For example, the processor 120 synchronizes an image signal input to a first display panel DP1 with an image signal input to a second display panel DP2 of the display module 150, which will be described later. In addition, the processor 120 synchronizes image signals input to subsidiary display panels of the first display panel DP1 and divides the image displayed on the first display panel DP1 into subsidiary images to display them on the subsidiary display panels. The processor 120 provides control so that the divided images displayed by the subsidiary display panels may be displayed as a single complete VR image.

Similarly, the processor 120 synchronizes image signals input to subsidiary display panels of the second display panel DP2 and divides the image displayed on the second display panel DP2 into subsidiary images to display them on the subsidiary display panels. The processor 120 provides control so that the divided images displayed by the subsidiary display panels may be displayed as a single complete VR image.

The memory 130 may store instructions or data received from or created by the processor 120 or the display module 150. The memory 130 may include, for example, programming modules such as a kernel 131, middleware 132, an application programming interface (API) 133, and applications 134. Each of the programming modules described above may be composed of software, firmware, hardware, or a combination of at least two of these.

The kernel 131 may control or manage system resources (e.g., the bus 110, the processor 120, the memory 130, etc.) used to execute operations or functions implemented in other programming modules, such as the middleware 132, the API 133 and the applications 134. In addition, the kernel 131 may provide an interface through which the middleware 132, the API 133 or the applications 134 can access to control or manage individual components of the display device 100.

The middleware 132 may act as intermediate software to allow the API 133 or the applications 134 to communicate with the kernel 131 in order to exchange data. In addition, in relation to task requests received from the applications 134, the middleware 132 may control task requests (e.g., scheduling or load balancing), for example, by assigning priorities for using the system resources of the display apparatus 100 (e.g., the bus 110, the processor 120, the memory 130, etc.) to at least one of the applications 134.

The API 133 may be an interface for the applications 134 to control functions provided by the kernel 131 or the middleware 132, and may include, for example, at least one interface or function (e.g., commands) for file control, window control, image processing, text control, etc. The display module 150 may display various types of information (e.g., multimedia data, text data, etc.) to the user. For example, the display module 150 may include a display panel (e.g., a liquid-crystal display (LCD) panel or an organic light-emitting diode (OLED) panel) and a display driver IC (DDI). The DDI may control pixels of the display panel to represent colors. For example, the DDI may include a circuit that converts digital signals into RGB analog values and transmits them to the display panel.

Figure 2:
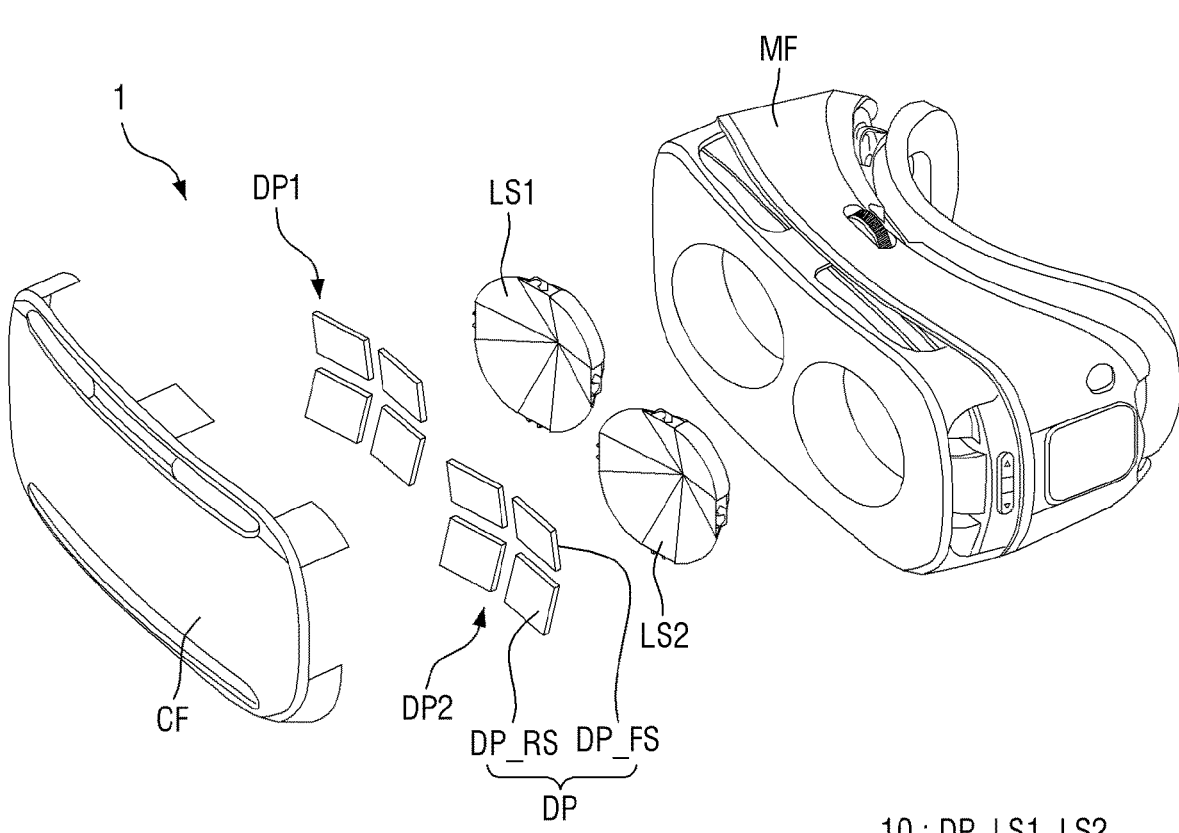
FIG. 2 is an exploded perspective view showing a display device according to an embodiment and a wearable device including the same.

FIG. 2 is an exploded perspective view showing a display device according to an embodiment and a wearable device including the same. A display device 10 and a wearable device 1 may be integral with each other so that a user can carry it and can readily wear it or take it off from her/his face or head. For example, the display device 10 may be assembled with the wearable device 1. The wearable device 1 may be implemented in the form of glasses or a head mount, and may provide images to the user using the display device 10.

Wearable devices 1 may include a see-through device that provides augmented reality based on actual external objects, and a see-closed device that provides virtual reality to a user using a screen independent of external objects. In the following description, a see-closed head mounted display device will be described as an example. It should be understood that the disclosure may not be limited thereto.

Referring to FIG. 2, the wearable device 1 may include a main frame MF mounted on a user's body, a display device 10 mounted on the main frame MF to display images, and a cover frame CF covering the display device 10. The display device 10 includes a display panel DP for displaying images, and first and second multi-channel lenses LS1 and LS2 for forming light paths so that a user can see the image display light from the display panel DP. The main frame MF may be worn on a user's face. The main frame MF may have a shape conforming to the shape of the user's head (face).

The display device 10. i.e., the display panel DP, the first and second multi-channel lenses LS1 and LS2 and the main frame MF may be integral with each other. For example, the display panel DP, and the first and second multi-channel lenses LS1 and LS2 may be assembled and mounted on the main frame MF. To this end, the main frame MF may include a space or structure where the display panel DP and the first and second multi-channel lenses LS1 and LS2 can be accommodated. Although not shown in the drawings, the main frame MF may further include a structure such as a strap and a belt for readily mounting. The main frame MF may further include a controller, the memory 130 (see FIG. 1), lens slots, etc. The controller may include the processor 120 of FIG. 1.

The display panel DP includes a first display panel DP1 and a second display panel DP2 and displays images and/or videos. The display panel DP may include a front surface DP_FS on which images and/or videos may be displayed, and a rear surface DP_RS opposite to the front surface DP_FS. Light for providing images and/or videos may be output from the front surface DP_FS of the display panel DP. As will be described later, the first and second multi-channel lenses LS1 and LS2 may be disposed on the front surface DP_FS of the display panel DP.

The display panel DP may be fixed (e.g., directly fixed) to the main frame MF, or may be fixed to the main frame MF by a separate fixing member. The display panel DP may be opaque, transparent, or translucent depending on the design of the display device 10, for example, the type of the display device 10.

The display panel DP may include a first display panel DP1 and a second display panel DP2 corresponding to the left and right eyes, respectively. In addition, the first display panel DP1 may include subsidiary display panels DP11, DP12, DP13 and DP14, and images output from the subsidiary display panels DP11, DP12, DP13 and DP14 may be extended to one another to form a single image. An image output by the first display panel DP1 may be a left-eye image. Similarly, the second display panel DP2 may include subsidiary display panels DP21. DP22, DP23 and DP24, and images output from the subsidiary display panels DP21, DP22, DP23 and DP24 may be extended to one another to form a single image. An image output by the second display panel DP2 may be a right-eye image.

Each of the subsidiary display panels DP11, DP12, DP13, DP14, DP21, DP22, DP23 and DP24 may be a light-emitting display panel including light-emitting elements. For example, each of the subsidiary display panels DP11, DP12, DP13, DP14, DP21, DP22, DP23 and DP24 may be an organic light-emitting display panel using organic light-emitting diodes, a micro light-emitting diode display panel using micro LEDs, a quantum-dot light-emitting display panel using quantum-dot light-emitting diodes, or an inorganic light-emitting display panel using inorganic light-emitting elements. In the following description, an organic light-emitting display panel may be employed as each of the subsidiary display panels DP11, DP12, DP13, DP14, DP21, DP22, DP23 and DP24. It should be understood, however, that the disclosure may not be limited thereto. The arrangement of the subsidiary display panels DP11. DP12, DP13, DP14, DP21, DP22, DP23 and DP24 will be described later with reference to FIGS. 7 and 8.

The first multi-channel lens LS1 may be disposed on the front surface DP_FS of the first display panel DP1 to form a path for light output from the first display panel DP1 so that the image display light can be seen by user's eye on the front side. Similarly, the second multi-channel lens LS2 may be disposed on the front surface DP_FS of the second display panel DP2 to form a path for light output from the second display panel DP2 so that the image display light can be seen by user's eye on the front side. The first and second multi-channel lenses LS1 and LS2 may provide multiple channels (or paths) through which the image display light output from the display panel DP passes. The multiple channels may pass the image display light output from the display panel DP through different paths to provide it to the user. The first and second multi-channel lenses LS1 and LS2 may refract and reflect the image display light output from the first subsidiary display panel DP1 and the second subsidiary display panel DP2 at least once to form paths to the user's eyes.

The cover frame CF may be disposed on the side of the rear surface DP_RS of the display panel DP to cover the display panel DP so that the display panel DP can be protected. The cover frame CF may cover the display panel DP to be mounted on the main frame MF.

Although not shown in the drawings, the display device 10 may further include a controller for controlling the overall operation of the display device 10 including the display panel DP. The controller may control an image display operation of the display panel DP, an audio device, etc. The controller includes the processor 120 described above with reference to FIG. 1 and may control operations of the elements of the display device including the display module 150 (see FIG. 2). For example, the controller may perform an operation for displaying a processed image on the display module 150. The controller may be implemented as a dedicated processor including an embedded processor and/or a general-purpose processor including a central processing unit or an application processor. It should be understood that the disclosure may not be limited thereto.

Figure 3:
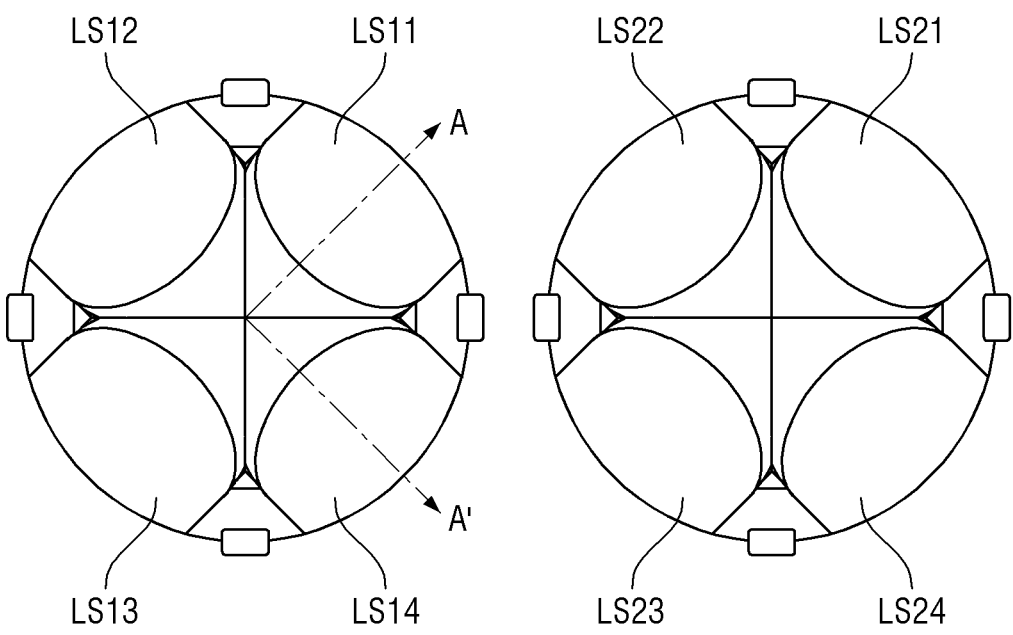
FIG. 3 is a front view of the multi-channel lenses shown in FIG. 2.
Figure 4:
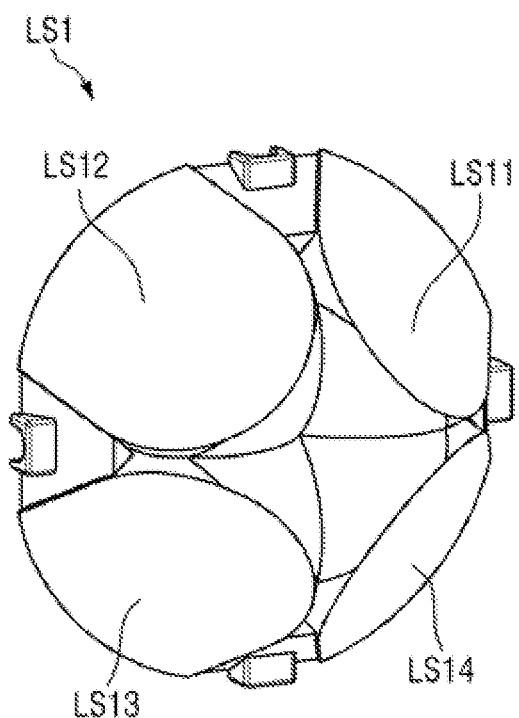
FIG. 4 is a perspective view showing one side and the opposite side of the multi-channel lens shown in FIGS. 2 and 3.

FIG. 3 is a front view of the multi-channel lenses shown in FIG. 2, and FIG. 4 is a perspective view showing one side and the opposite side of the multi-channel lens shown in FIGS. 2 and 3. Referring to FIGS. 3 and 4, according to the embodiment of the disclosure, the first and second multi-channel lenses LS1 and LS2 may be disposed on the front surfaces of the first display panel DP1 and the second display panel DP2, respectively, such that they may be located in line with the user's eyes, respectively. The first and second multi-channel lenses LS1 and LS2 corresponding to the user's eyes, respectively, may be symmetrical to each other, and may have substantially the same structure. It should be understood, however, that the disclosure may not be limited thereto.

The first multi-channel lens LS1 may include subsidiary lenses LS11, LS12, LS13 and LS14, and the second multi-channel lens LS2 may include subsidiary lens LS21, LS22, LS23 and LS24. According to the embodiment of the disclosure, the first multi-channel lens LS1 may include a first subsidiary lens LS11, a second subsidiary lens LS12, a third subsidiary lens LS13 and a fourth subsidiary lens LS14. The second multi-channel lens LS2 may include a fifth subsidiary lens LS21, a sixth subsidiary lens LS22, a seventh subsidiary lens LS23, and an eighth subsidiary lens LS24. It should be noted that the number of subsidiary lenses LS11. LS12, LS13, LS14, LS21, LS22, LS23 and LS24 may not be limited thereto. According to the embodiment of the disclosure, since the second multi-channel lens LS2 may be substantially identical to or similar to the first multi-channel lens LS1. Therefore, the following description will focus on the first multi-channel lens LS1.

The first multi-channel lens LS1 shown in FIG. 3 may have a generally circular shape in case that viewed from the front. The first subsidiary lens LS11, the second subsidiary lens LS12, the third subsidiary lens LS13 and the fourth subsidiary lens LS14 may be arranged such that they surround the center of the circle in case that viewed from the front, for example, in a clover shape. For example, as shown in FIG. 3, the first subsidiary lens LS11, the second subsidiary lens LS12, the third subsidiary lens LS13 and the fourth subsidiary lens LS14 may be disposed at the upper right end, the upper left end, the lower left end and the lower right end of the center of the first multi-channel lens LS1. The first subsidiary lens LS11, the second subsidiary lens LS12, the third subsidiary lens LS13 and the fourth subsidiary lens LS14 may be extended to one another as a single piece, or may be separated from one another.

More specifically, FIG. 4 is a perspective view showing one side of the first multi-channel lens LS1 which faces a user's eye. Referring to FIG. 4, the schematic cross-section of the first multi-channel lens LS1 may be disposed in a generally hemispherical shape. One side of the first multi-channel lens LS1 which faces the main frame MF or a user's eye may have a convex shape, whereas the opposite side of the first multi-channel lens LS1 which faces the display panels DP may have a concave shape, as shown in FIG. 6 below.

The second multi-channel lens LS2 may also have a generally hemispherical cross-section, and the fifth subsidiary lens LS21, the sixth subsidiary lens LS22, the seventh subsidiary lens LS23 and the eighth subsidiary lens LS24 may be disposed in a circular shape or a clover shape surrounding the center of the second multi-channel lens LS2 in case that viewed from the front.

Figure 5:
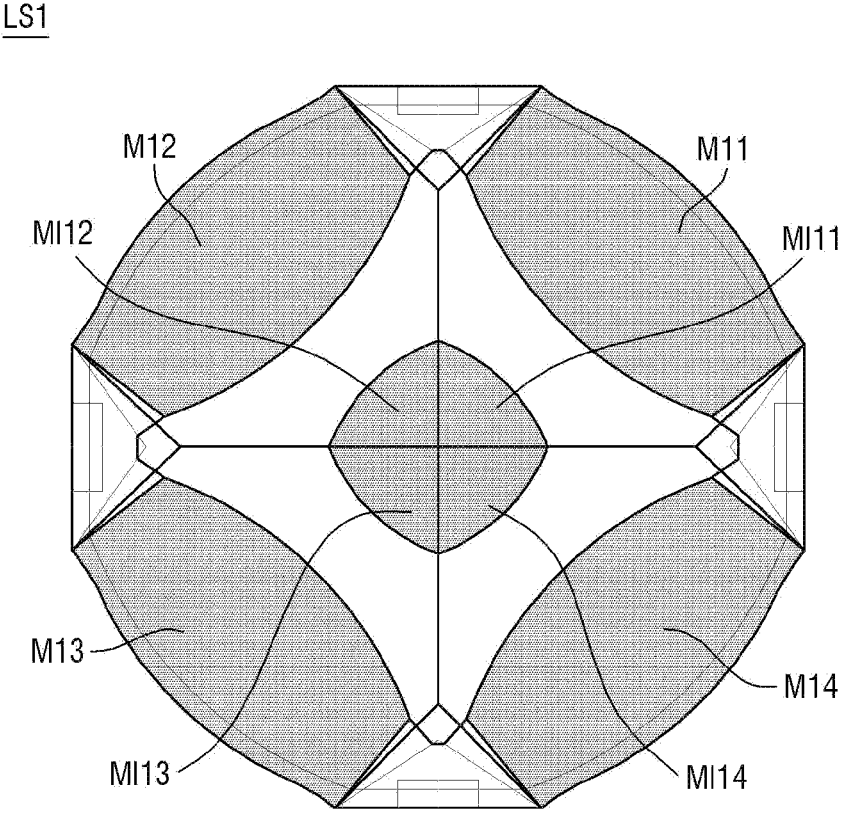
FIG. 5 is a front view showing mirror-coated parts of the multi-channel lens shown in FIG. 4 in detail.
Figure 6:
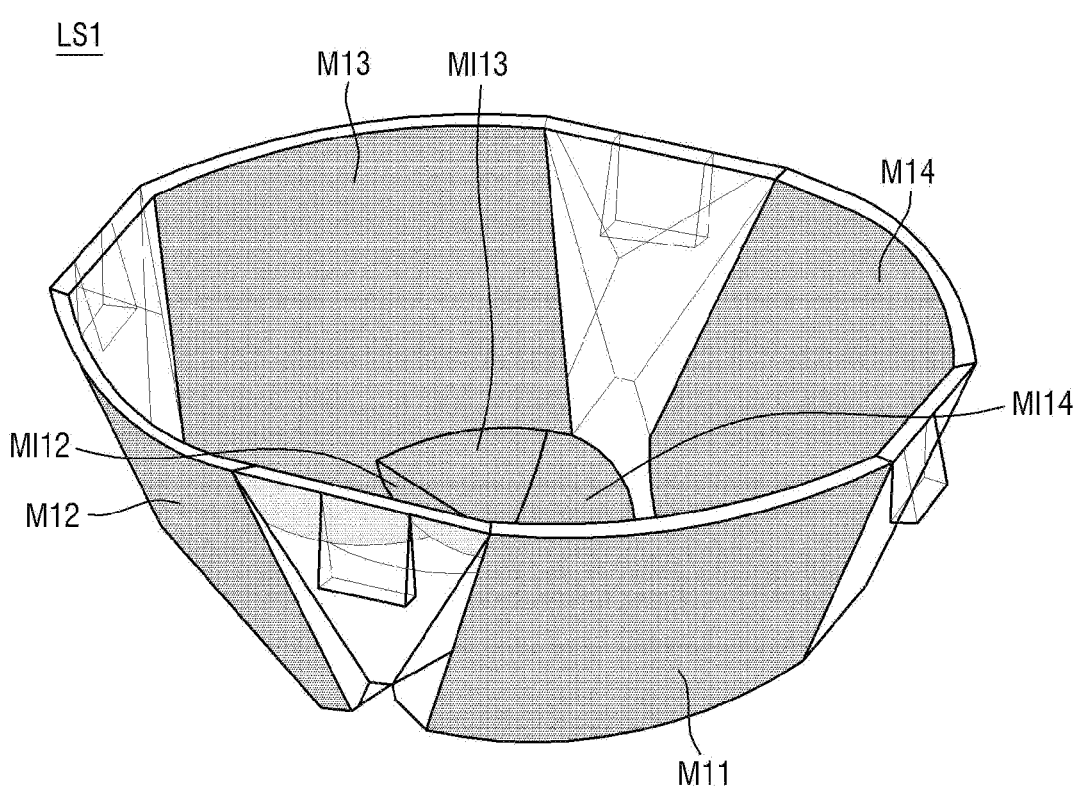
FIG. 6 is a perspective view of the rear side of the mirror-coated parts of the multi-channel lens shown in FIG. 5 in detail.

FIG. 5 is a front view showing mirror-coated parts of the multi-channel lens shown in FIG. 4 in detail, and FIG. 6 is a perspective view showing the rear side of the mirror-coated parts of the multi-channel lens shown in FIG. 5 in detail. Referring to FIGS. 5 and 6, the front surfaces or the rear surfaces of the first to fourth subsidiary lenses LS11, LS12, LS13 and LS14 disposed in the first multi-channel lens LS1 may be the mirror-coated parts. Accordingly, a reflective material may be disposed or coated on the first to fourth mirror-coated parts M11, M12, M13 and M14 separately disposed on the first to fourth subsidiary lenses LS11, LS12, LS13 and LS14, respectively.

The first to fourth mirror-coated parts M11, M12, M13 and M14 separately disposed on the first to fourth subsidiary lenses LS11. LS12, LS13 and LS14, respectively, face the central portion of the first multi-channel lens LS1, i.e., the concaved portion of the first multi-channel lens LS1. Accordingly, the first to fourth mirror-coated parts M11, M12, M13 and M14 may reflect the image display light incident from the rear surface of the first multi-channel lens LS1 toward the concaved portion that may be the central portion of the first multi-channel lens LS1.

First to fourth inner coated parts MI11, MI12, MI13 and MI14 may be defined on the concaved portion that may be the central portion of the first multi-channel lens LS1 and may also be the rear surface of the first multi-channel lens LS1, which face the first to fourth mirror-coated parts M11, M12, M13 and M14. A reflective material may also be disposed or coated on the first to fourth inner coated parts MI11, MI12, MI13 and MI14, like the first to fourth mirror-coated parts M11, M12, M13 and M14. Accordingly, the first to fourth inner coated parts MI11, MI12, MI13 and MI14 may reflect the image display light reflected from the first to fourth mirror-coated parts M11, M12, M13 and M14 toward the user's eyes on the front side. The structure of the first to fourth mirror-coated parts M11, M12, M13 and M14 and the first to fourth inner coated parts MI11, MI12, MI13 and MI14 of the first multi-channel lens LS1 may be equally applied to the second multi-channel structure LS2.

Figure 7:
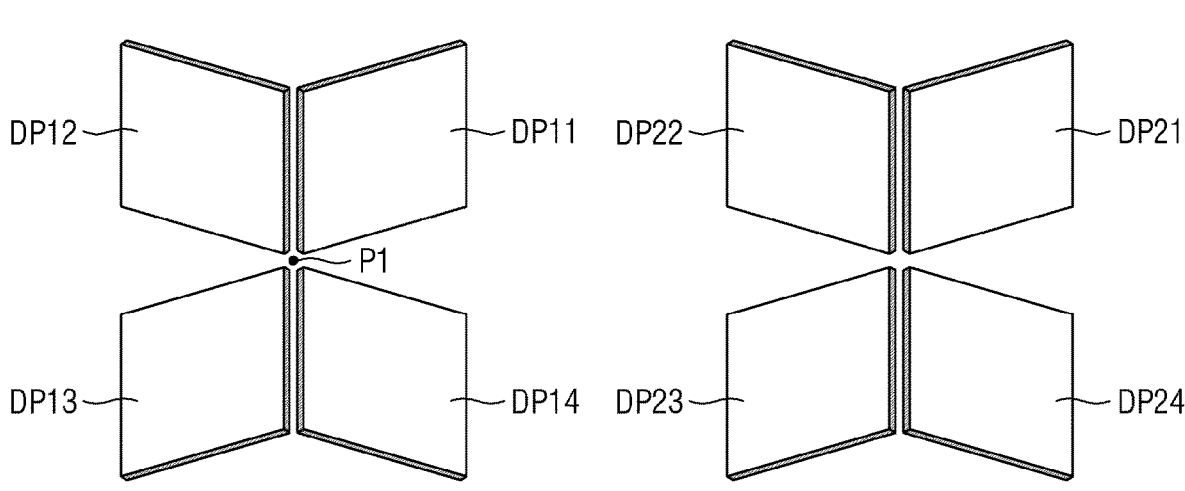
FIG. 7 is a front view of the display panels shown in FIG. 2.

FIG. 7 is a front view of the display panels shown in FIG. 2. Referring to FIGS. 2 and 7, according to the embodiment of the disclosure, the first and second display panels DP1 and DP2 corresponding to the user's eyes, respectively, may be symmetrical to each other, and may have substantially the same structure. It should be understood, however, that the disclosure may not be limited thereto.

The first and second multi-channel lenses LS1 and LS2 may be disposed on front surfaces of the first and second display panels DP1 and DP2. The first and second display panels DP1 and DP2 may include subsidiary display panels DP11, DP12, DP13, DP14, DP21, DP22, DP23 and DP24.

According to the embodiment of the disclosure, the first display panel DP1 may include the first subsidiary display panel DP11, the second subsidiary display panel DP12, the third subsidiary display panel DP13, and the fourth subsidiary display panel DP14. The second display panel DP2 may include the fifth subsidiary display panel DP21, the sixth subsidiary display panel DP22, the seventh subsidiary display panel DP23, and the eighth subsidiary display panel DP24. It should be noted that the number of the subsidiary display panels DP11. DP12, DP13, DP14, DP21, DP22, DP23 and DP24 may not be limited thereto but may vary depending on the subsidiary lenses LS11, LS12, LS13, LS14, LS21, LS22, LS23 and LS24. The number of the subsidiary display panels of the first and second display panels DP1 and DP2 may be equal to the number of the subsidiary lenses of the first and second multi-channel lenses LS1 and LS2. For example, in case that the first multi-channel lens LS1 has six subsidiary lenses, the first display panel DP1 has six subsidiary display panels.

Each of the subsidiary display panels DP11, DP12, DP13, DP14, DP21, DP22, DP23 and DP24 shown in FIG. 7 may have, but may not be limited to, a generally diamond shape in case that viewed from the front. For example, it may have a rectangular, square, or trapezoidal shape. The subsidiary display panels DP11, DP12, DP13, DP14, DP21, DP22, DP23 and DP24 may be congruent in size and shape. According to the embodiment of the disclosure, since the second display panel DP2 may be substantially identical to or similar to the first display panel DP1, description will focus on the first display panel DP1.

The first subsidiary display panel DP11, the second subsidiary display panel DP12, the third subsidiary display panel DP13 and the fourth subsidiary display panel DP14 of the first display panel DP1 may be arranged in the counterclockwise direction, and may be arranged in a clover shape to surround the center of the first display panel DP1 in case that viewed from the front. For example, as shown in FIG. 7, the first subsidiary display panel DP11, the second subsidiary display panel DP12, the third subsidiary display panel DP13 and the fourth subsidiary display panel DP14 may be arranged at the upper right, upper left, lower left and lower right ends, respectively, with respect to the center of the first display panel DP1. The vertex in the third quadrant of the first subsidiary display panel DP11, the vertex in the fourth quadrant of the second subsidiary display panel DP12, the vertex in the first quadrant of the third subsidiary display panel DP13 and the vertex in the second quadrant of the fourth subsidiary display panel DP14 may get together at one center P1. In addition, the first subsidiary display panel DP11, the second subsidiary display panel DP12, the third subsidiary display panel DP13, and the fourth subsidiary display panel DP14 may be spaced apart from one another.

Figure 8:
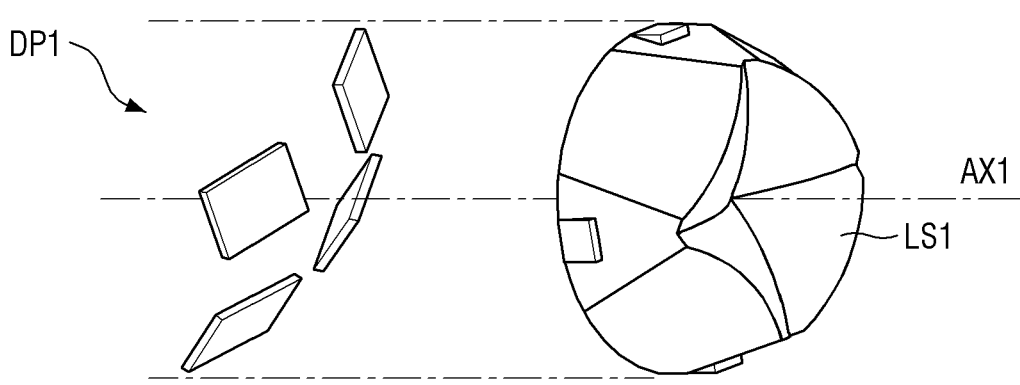
FIG. 8 is an exploded perspective view illustrating an arrangement of the display panels and the multi-channel lenses shown in FIG. 2 and a coupling structure.
Figure 8:
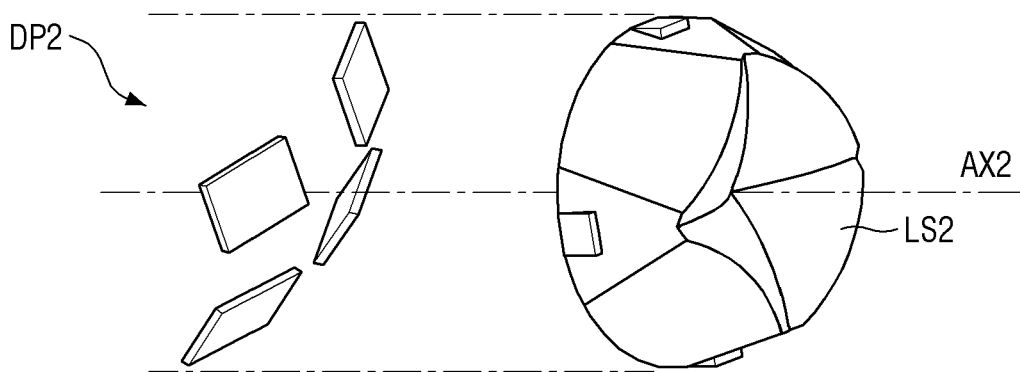

FIG. 8 is an exploded perspective view illustrating an arrangement of the display panels and the multi-channel lenses shown in FIG. 2 and a coupling structure. Referring to FIGS. 7 and 8, the subsidiary display panels DP11, DP12, DP13, and DP14 of the first display panel DP1 may be arranged such that they face the rear surfaces of the subsidiary lenses LS11, LS12, LS13 and LS14, respectively. Specifically, the front surface of the first subsidiary display panel DP11 overlaps the first mirror-coated part M11 (see FIG. 6) of the first subsidiary lens LS11, the front surface of the second subsidiary display panel DP12 overlaps the second mirror-coated part M12 (see FIG. 6) of the second subsidiary lens LS12, the front surface of the third subsidiary display panel DP13 overlaps the third mirror-coated part M13 (see FIG. 6) of the third subsidiary lens LS13, and the front surface of the fourth subsidiary display panel DP14 overlaps the fourth mirror-coated part M14 (see FIG. 6) of the fourth subsidiary lens LS14. Accordingly, the first to fourth mirror-coated parts M11, M12, M13 and M14 may reflect image display light incident from the subsidiary display panels DP1, DP2, DP3 and DP4 respectively toward the concaved portion, which may be the center of the first multi-channel lens LS1. The first multi-channel lens LS1 may overlap the first display panel DP1, and the first multi-channel lens LS1 may be disposed to cover the image display surface of the first display panel DP1.

Figure 9:
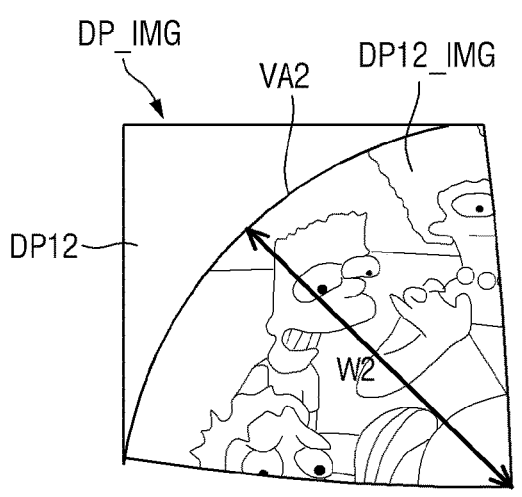
FIG. 9 is a view showing an image displayed on the display panels in case that a user's pupil is located at the center.
Figure 9:
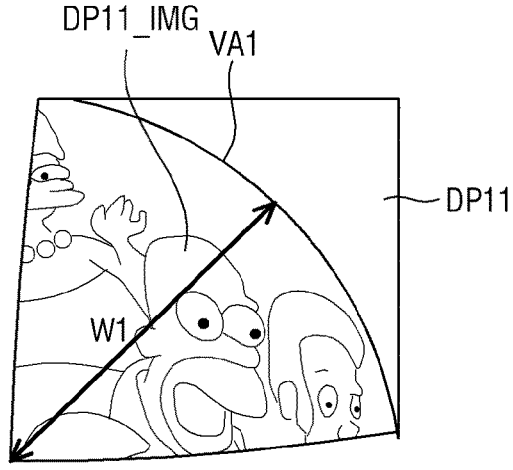
Figure 9:
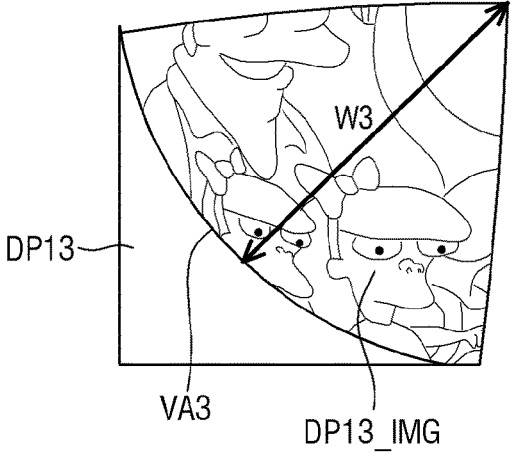
Figure 9:
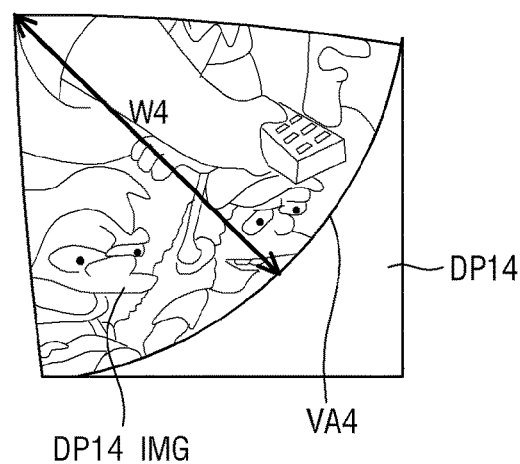
Figure 10:
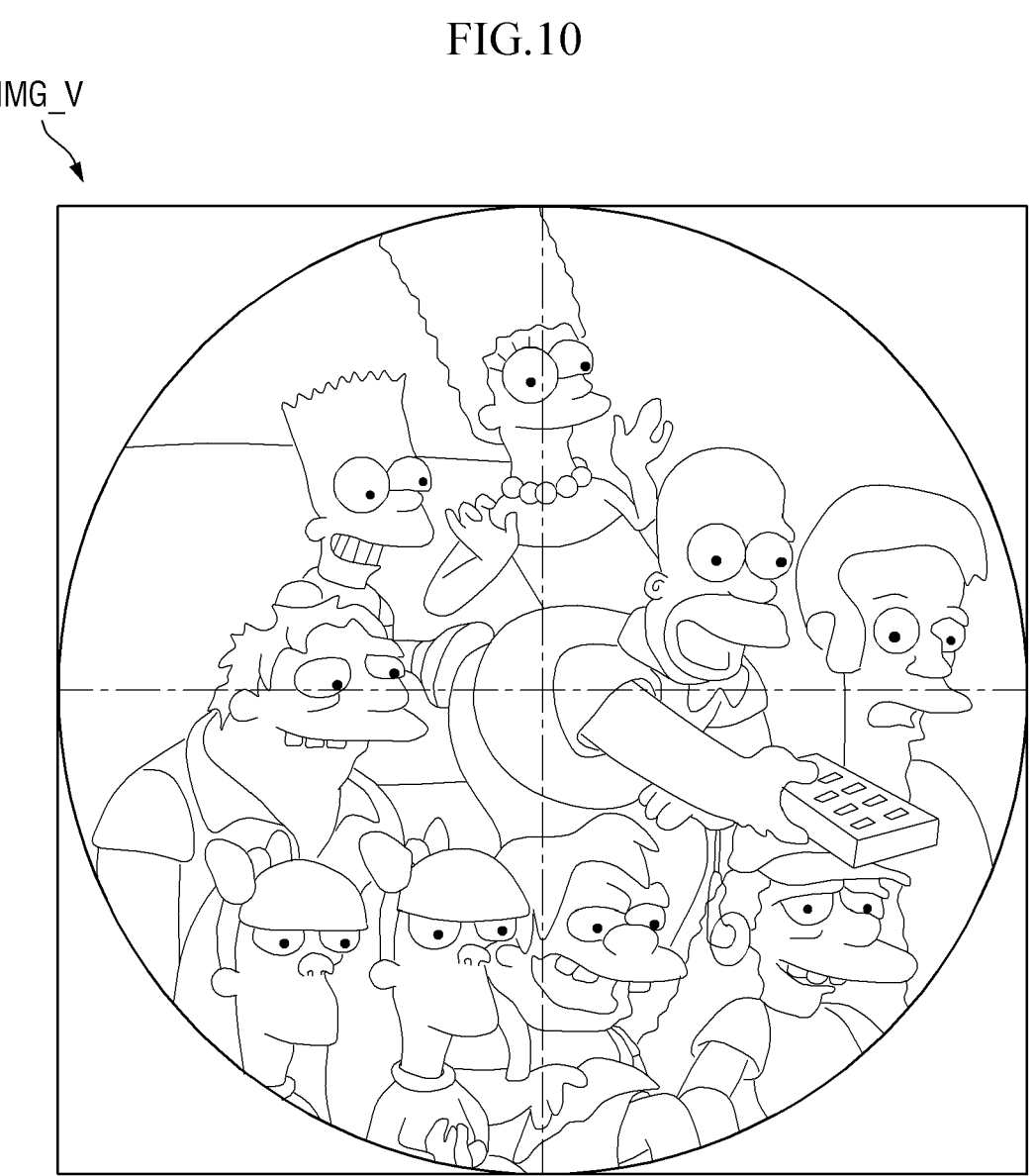
FIG. 10 is a view showing a VR image recognized by the user in case that a user's pupil is located at the center.

FIG. 9 is a view showing an image displayed on the display panels in case that a user's pupil may be located at the center, and FIG. 10 is a view showing a VR image recognized by the user in case that a user's pupil may be located at the center.

In case that a user on the front side gazes at a display image DP_IMG and/or a VR image to be described later through the first and second multi-channel lenses LS1 and LS2, the first subsidiary display panel DP11, the second subsidiary display panel DP12, the third subsidiary display panel DP13 and the fourth subsidiary display panel DP14 display a first divided display image DP11_IMG, a second divided display image DP12_IMG, a third divided display image DP13_IMG and a fourth divided display image DP14_IMG respectively on image display surfaces toward the user's pupils PP.

Specifically, the first subsidiary display panel DP11 displays the first divided display image DP11_IMG, the second subsidiary display panel DP12 displays the second divided display image DP12_IMG, the third subsidiary display panel DP13 displays the third divided display image DP13_IMG, and the fourth subsidiary display panel DP14 displays the fourth divided display image DP14_IMG. The first divided display image DP11_IMG, the second divided display image DP12_IMG, the third divided display image DP13_IMG, and the fourth divided display image DP14_IMG may be arranged in the counterclockwise direction.

In case that the user's pupil PP generally looks at the center, the first divided display image DP11_IMG, the second divided display image DP12_IMG, the third divided display image DP13_IMG and the fourth divided display image DP14_IMG may be displayed to have generally the same size. The size of the first divided display image DP11_IMG, the second divided display image DP12_IMG, the third divided display image DP13_IMG and the fourth divided display image DP14_IMG may be measured with respect to the boundaries of a first divided viewing area VA1, a second divided viewing area VA2, a third divided viewing area VA3, and a fourth divided viewing area VA4. It should be understood, however, that the disclosure may not be limited thereto. The size of the first divided display image DP11_IMG, the second divided display image DP12_IMG, the third divided display image DP13_IMG and the fourth divided display image DP14_IMG may be measured with respect to the intersections of the boundaries therebetween.

As shown in FIG. 9, a first width W1 of the first divided display image DP11_IMG, a second width W2 of the second divided display image DP12_IMG, a third width W3 of the third divided display image DP13_IMG, and a fourth width W4 of the fourth divided display image DP14_IMG may all be substantially equal. Accordingly, the first divided display image DP_IMG11, the second divided display image DP_IMG12, the third divided display image DP_IMG13 and the fourth divided display image DP_IMG14 may be displayed on the first subsidiary display panel DP11, the second subsidiary display panel DP12, the third subsidiary display panel DP13 and the fourth subsidiary display panel DP14, respectively, with substantially a same magnification.

The first divided display image DP11_IMG displayed by the first subsidiary display panel DP11 passes through the channel provided by the first subsidiary lens LS11 (see FIG. 3), and the second divided display image DP12_IMG displayed by the second subsidiary display panel DP12 passes through the channel provided by the second subsidiary lens LS12 (see FIG. 3). In addition, the third divided display image DP13_IMG displayed by the third subsidiary display panel DP13 passes through the channel provided by the third subsidiary lens LS13 (see FIG. 3), and the fourth divided display image DP14_IMG displayed by the fourth subsidiary display panel DP14 passes through the channel provided by the fourth subsidiary lens LS14 (see FIG. 3). In this way, the divided display images passing through the first to fourth subsidiary lenses LS11, LS12, LS13 and LS14 may be extended to one another to form a single complete screen as shown in FIG. 10. The single screen may be a VR image.

Referring back to FIG. 10, the display device 10 may output a foveated-rendered VR image IMG_V to the display panels DP based on the position of the user's pupil PP. Herein, the foveated rendering may be one of the rendering techniques which reduces the rendering workload by increasing the image quality of a gaze zone while greatly reducing the image quality in the peripheral vision. Specifically, the foveated rendering may refer to an image processing scheme that gives a user an immersive, high-quality VR experience while reducing graphics computing load by way of displaying only the zone where the user gazes with a maximum image quality and other zones with a lower image quality. In addition, the VR image IMG_V may refer to an image and/or a video recognized by the user through the first and second multi-channel lenses LS1 and LS2. Referring to FIGS. 9 and 10, a VR image IMG_V may be generated by combining parts of the divided display images DP11_IMG, DP12_IMG, DP13_IMG and DP14_IMG.

Specifically, the first divided display image DP11_IMG, the second divided display image DP12_IMG, the third divided display image DP13_IMG and the fourth divided display image DP14_IMG may include the first divided viewing area VA1, the second divided viewing area VA2, the third divided viewing area VA3, and the fourth divided viewing area VA4, respectively. The first divided viewing area VA1, the second divided viewing area VA2, the third divided viewing area VA3 and the fourth divided viewing area VA4 may be defined by, for example, the optical characteristics of the first and second multi-channel lenses LS1 and LS2 and the user's gaze direction. The shapes, sizes and/or magnifications of the first divided viewing area VA1, the second divided viewing area VA2, the third divided viewing area VA3 and the fourth divided viewing area VA4 may vary depending on the optical characteristics of the first and second multi-channel lenses LS1 and LS2 and the user's gaze direction.

In case that the user's pupil PP may be located substantially at the central point, the display panel DP may display the display image DP_IMG so that the magnification at the central region of the display image DP_IMG may be greater than that of the peripheral region of the display image DP_IMG surrounding the central region. Incidentally, the central region of the VR image IMG_V may have a relatively high density of pixels PX as compared to the peripheral region surrounding it. In this instance, the density of pixels PX may increase from the edge of the VR image IMG_V toward the center of the VR image IMG_V. Accordingly, the central region of the VR image IMG_V may be displayed to have a higher image quality than that of the peripheral region. The central region of the VR image IMG_V may refer to the boundaries between the image of the first divided viewing area VA1, the image of the second divided viewing area VA2, the image of the third divided viewing area VA3 and the image of the fourth divided viewing area VA4 which may be recognized as a combined image to the user, and areas adjacent the boundaries. It should be understood, however, that the disclosure may not be limited thereto.

Figure 11:
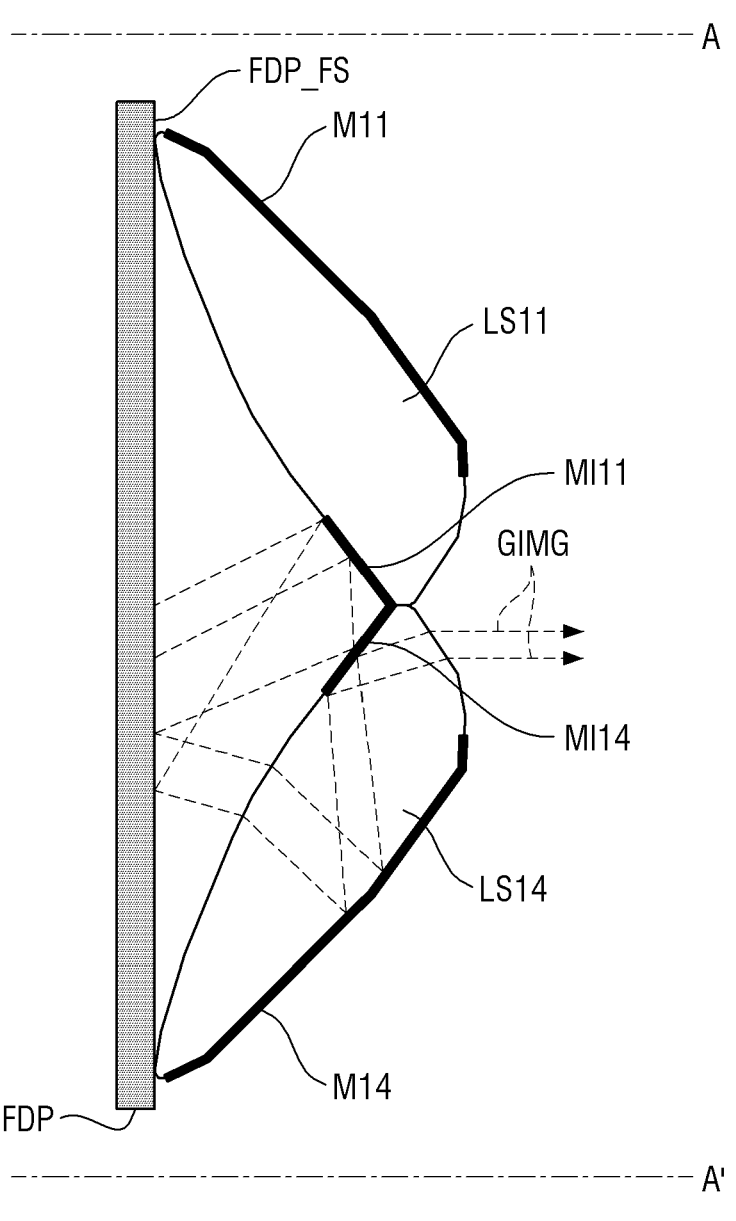
FIG. 11 is a schematic cross-sectional view for illustrating display paths of ghost images in a display device and the causes.

FIG. 11 is a schematic cross-sectional view for illustrating display paths of ghost images in a display device and the causes. As shown in FIG. 11, in case that a flat display panel FDP may be employed, the first to fourth mirror-coated parts M11, M12, M13 and M14 of the first to fourth subsidiary lenses LS11, LS12, LS13 and LS14 disposed in the first multi-channel lens LS1, respectively, reflect the image display light incident onto the rear surface towards the central concaved portion (i.e., the first to fourth inner coated parts MI11, MI12, MI13 and MI14) of lens LS1.

The image display light incident onto the rear surface of first multi-channel lens LS1 (i.e., the image display light output from the front surface FDP_FS of the display panel FDP) have to be applied to the first to fourth mirror-coated parts M11, M12, M13 and M14 in order to form the paths by being reflected off the first to fourth mirror-coated parts M11, M12, M13 and M14. However, if the image display light output from the display panel FDP may be reflected off the rear surfaces of the first to fourth inner coated parts MI11, MI12, MI13 and MI14 is in FIG. 11, undesired optical paths may be generated, and accordingly ghost images GIMG may be seen.

Hereinafter, according to the embodiment of the disclosure, subsidiary display panels DP11, DP12, DP13, DP14, DP21, DP22, DP23 and DP24 may be disposed such that they may be inclined by a first angle toward the subsidiary lenses LS11, LS12, LS13, LS14, LS21, LS22, LS23 and LS24 facing them, respectively, (in the direction of the outer circumferential surface of the lenses) so that the image display light output from the display panels DP may not be directed toward the rear surfaces of the first to fourth inner coated-parts MI11, MI12, MI13 and MI14.

Figure 12:
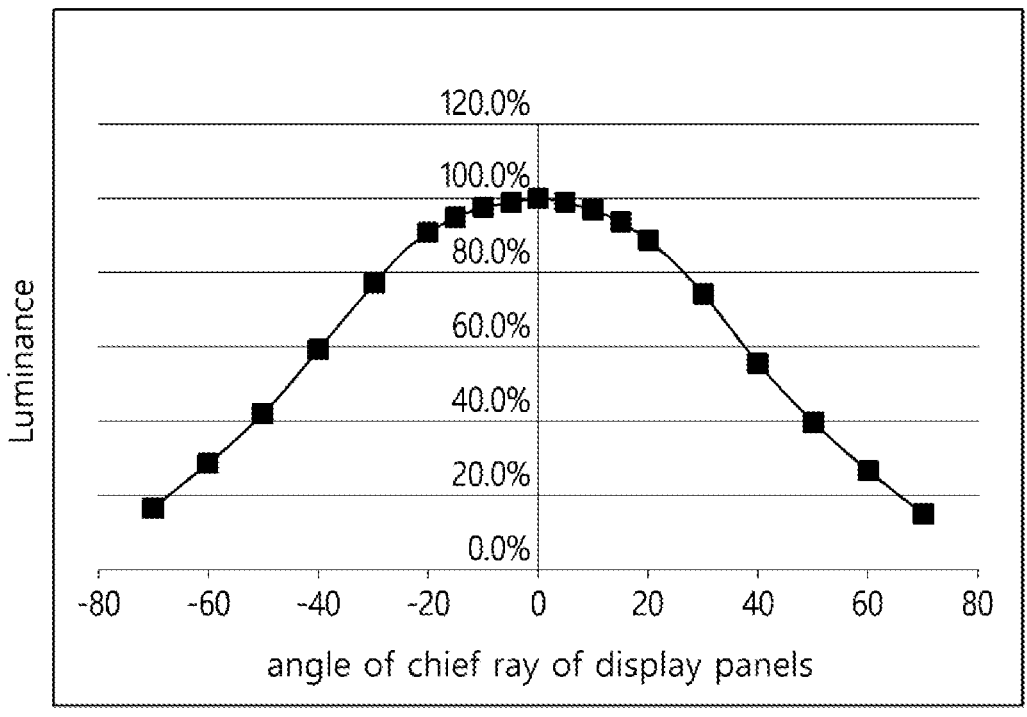
FIG. 12 is a graph for illustrating luminance versus angle of a chief ray of the display panels of FIGS. 7 and 8.
Figure 13:
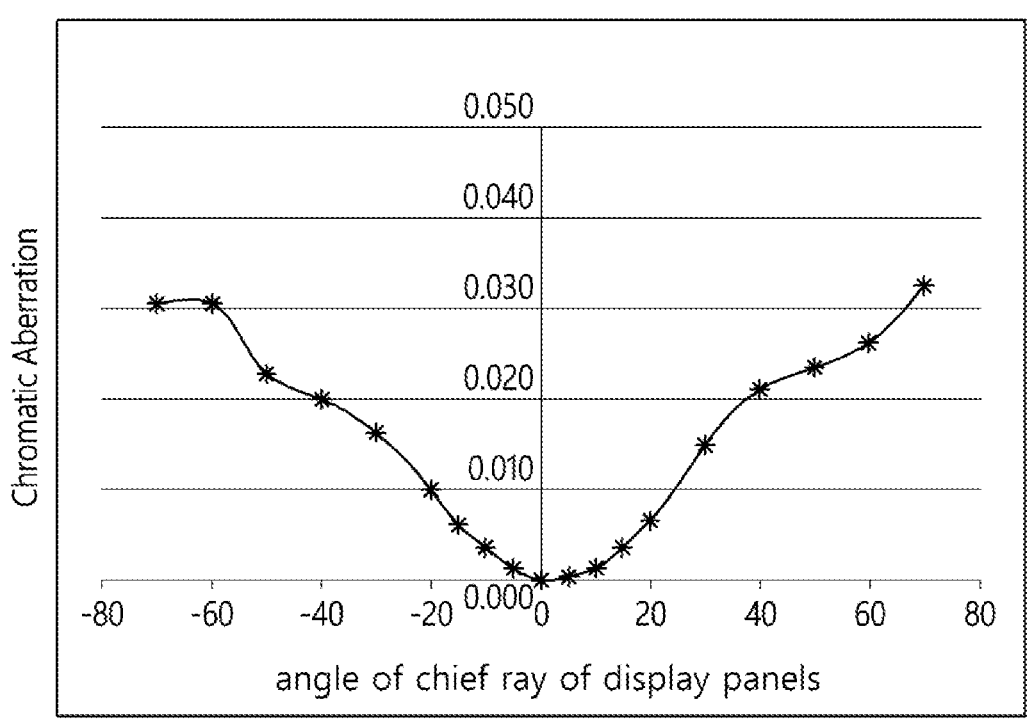
FIG. 13 is a graph for illustrating color difference versus angle of a chief ray of the display panels of FIGS. 7 and 8.
Figure 14:
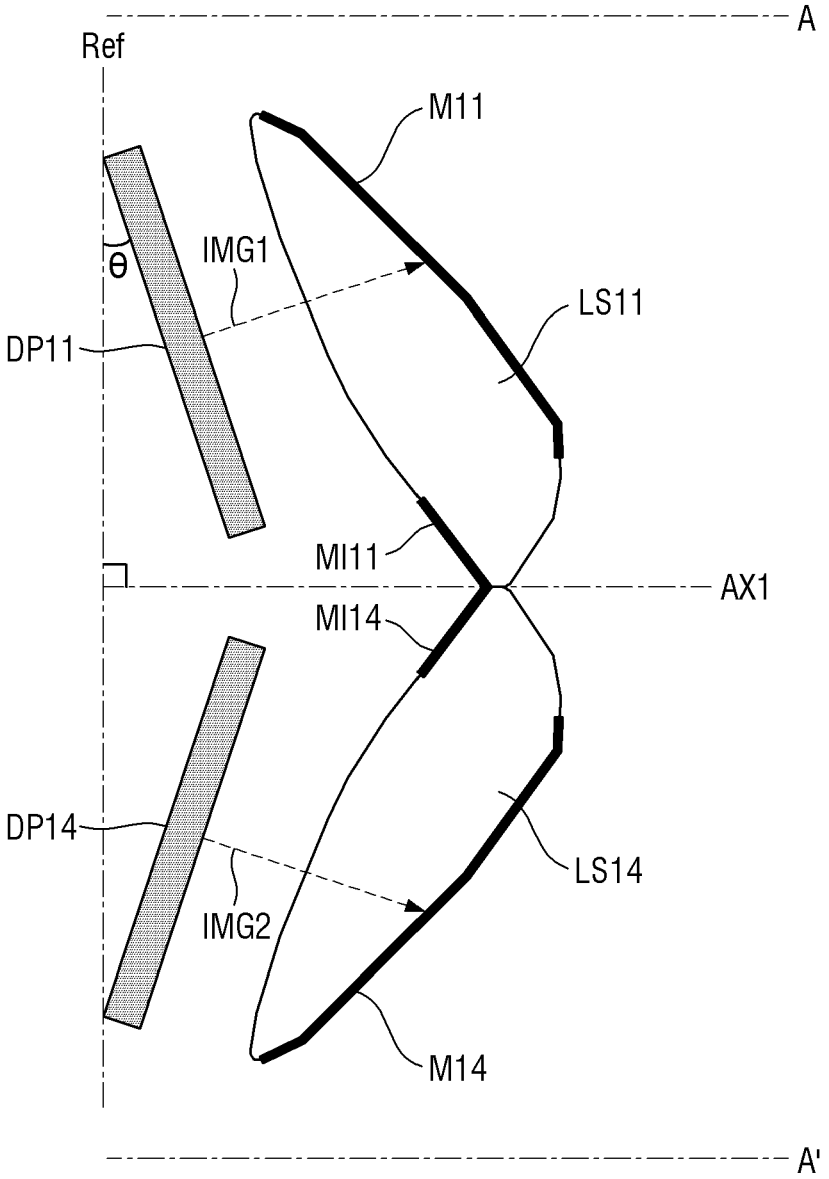
FIG. 14 is a schematic cross-sectional view of the display module taken along line A-A' of FIG. 3.

FIG. 12 is a graph for illustrating luminance versus angle of a chief ray of the display panels of FIGS. 7 and 8, FIG. 13 is a graph for illustrating color difference versus angle of a chief ray of the display panels of FIGS. 7 and 8, and FIG. 14 is a schematic cross-sectional view of the display module, taken along line A-A' of FIG. 3. Referring to FIGS. 12 and 13, luminance and chromatic aberration may vary depending on the angle of a chief ray (i.e., angle between the chief ray or principal ray and the optical axis) of the display panels DP. It can be seen that the luminance may be the highest (i.e., near 100%) in case that the angle of the chief ray of the display panel DP is about 0 degrees, about 85% at about 20 degrees, and about 80% or less at about 30 degrees.

Referring to FIG. 13, the chromatic aberration may be about 0.02 or less in case that the angle of the chief ray (i.e., angle between the chief ray or principal ray and the optical axis) of the display panels DP is about 40 degrees or less, the chromatic aberration may be about 0.010 or less in case that the angle of the chief ray of the display panels DP is about 20 degrees or less, and the chromatic aberration may be about zero in case that the angle of the chief ray of the display panels DP may be about zero.

Accordingly as shown in FIG. 14 according to this embodiment, the first display panel DP1 has an inclination equal to the first angle θ from the reference plane Ref, and the subsidiary display panels DP11. DP12, DP13 and DP14 may be arranged to face the rear surfaces of the respective subsidiary lenses LS11, LS12, LS13 and LS14 respectively. In this manner, light output from the display panels can be incident on the multi-channel lens at about 0 degrees (i.e., parallel to the optical axis) without generating any ghost image, so that the luminance may be the largest and the color difference effect may be the smallest. The first angle θ may be, but may not be limited to about 20 to about 30 degrees. The first angle θ may be adjusted so that the angle of the chief ray incident on the subsidiary lenses LS11, LS12, LS13 and LS14 from the display panels DP11, DP12, DP13 and DP14 may be zero. The reference plane Ref may be a virtual plane perpendicular to the optical axes AX1 and AX2 of the first and second multi-channel lenses LS1 and LS2. The optical axes AX1 and AX2 may be extended in the direction of human eyes.

In case that a user on the front side gazes at the display images displayed by the first display panel DP1 and the second display panel DP2 through the first and second multi-channel lenses LS1 and LS2 respectively, the first display panel DP1 and the second display panel DP2 display the display images on the left and right eye image display surfaces toward the user's pupils PP. Specifically, the subsidiary lenses LS11, LS12, LS13, LS14, LS21, LS22, LS23 and LS24 disposed on the first and second multi-channel lenses LS1 and LS2 provide channels through which light output from the front surface DP_FS of the subsidiary display panels DP11, DP12, DP13, DP14, DP21, DP22, DP23 and DP24 pass. Image display light output from the front surfaces DP_FS of the subsidiary display panels DP11, DP12, DP13, DP14, DP21, DP22, DP23 and DP24 may pass through the channels via different paths. Herein, each image display light may include partial video and/or partial image for forming one complete VR image. For example, as shown in FIG. 14, the first subsidiary lens LS11 may provide a channel through which the image display light IMG1 output from the first display panel DP11 passes, and the fourth subsidiary lens LS14 may provide a channel through which the image display light IMG2 output from the fourth display panel DP14 passes. Similarly, although not shown in the drawings, the second subsidiary lens LS12 and the third subsidiary lens LS13 may provide channels through which light output from the second subsidiary display panel DP12 and the third subsidiary display panel DP13 may respectively pass.

According to the embodiment of the disclosure, the image display light passing through the subsidiary lens LS11, LS12, LS13, LS14, LS21, LS22, LS23 and LS24 may be provided to the user after they have been reflected twice, once by the first to fourth mirror-coated parts M11, M12, M13 and M14 another time by the first to fourth inner coated parts MI11, MI12, MI13 and MI14. It should be understood, however, that the disclosure may not be limited thereto.

Figure 15:
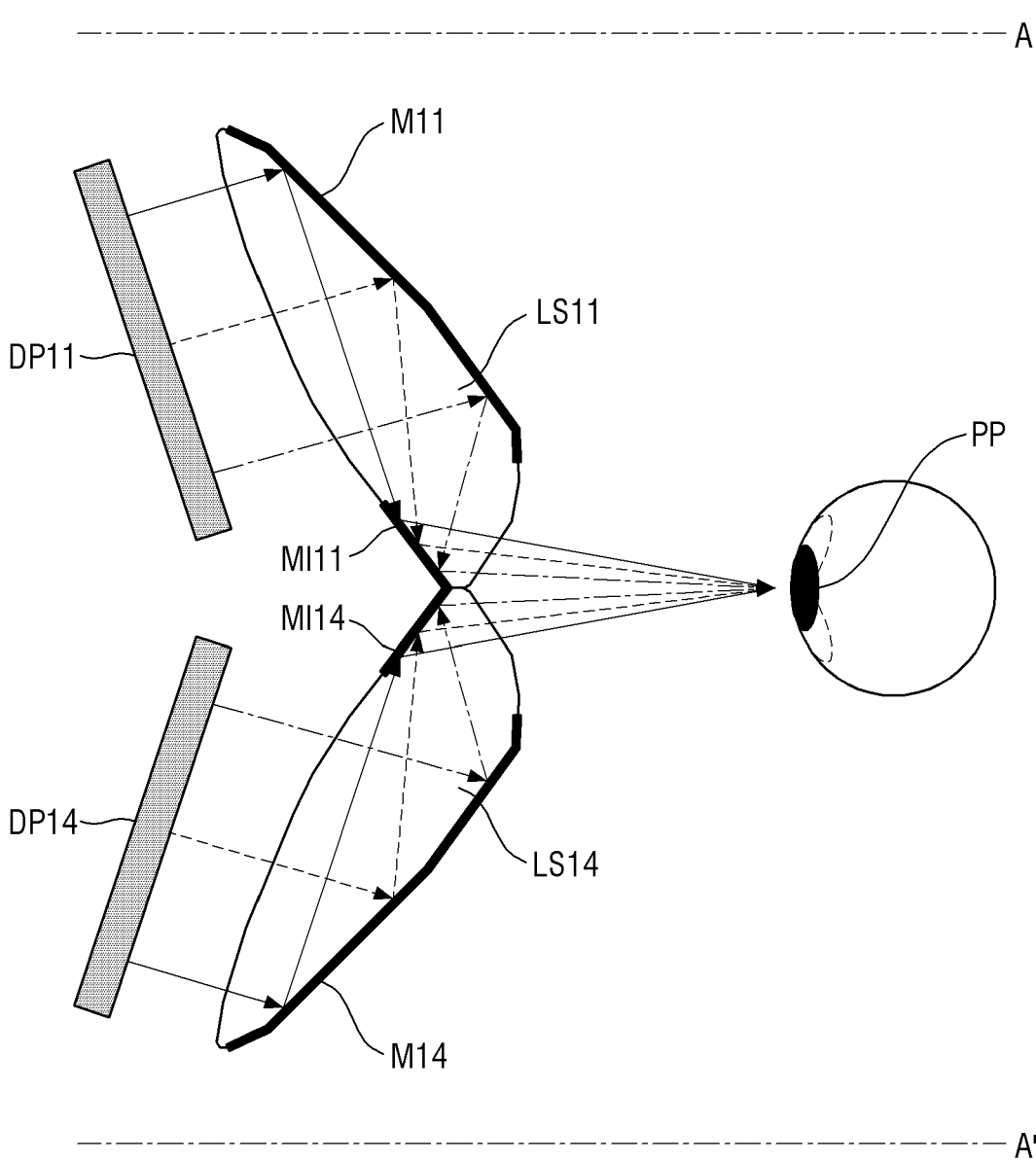
FIG. 15 is a view showing light output in the example shown in FIG. 14.

FIG. 15 is a view showing light output in the example shown in FIG. 14. As shown in FIG. 15, the first subsidiary display panel DP11 may be disposed to have a first angle in the outward direction. The fourth subsidiary display panel DP4 may be disposed to have the first angle in the outward direction. In this manner, light output from the first subsidiary display panel DP1 and the fourth subsidiary display panel DP4 may not be directed toward the rear surfaces of the first to fourth inner coated-parts MI11, MI12, MI13 and MI14. Accordingly, the image display light output from the first subsidiary display panel DP1 may be reflected by the first mirror-coated part M11 of the first subsidiary lens LS11 and directed to the first inner coated part MI11. The first inner coated part MI11 may then reflect the image display light reflected from the first mirror-coated part M11 toward the user's eyeball on the front side.

Similarly, the image display light output from the fourth subsidiary display panel DP4 may be reflected by the fourth mirror-coated part M14 of the fourth subsidiary lens LS14 and directed to the fourth inner coated part MI14. The fourth inner coated part MI14 may then reflect the image display light reflected from the fourth mirror-coated part M14 toward the user's eyeball on the front side.

The image display light output from the second, third, fifth to eighth subsidiary display panels DP12, DP13, DP21, DP22, DP23 and DP24, which may not be shown in FIG. 15, may be reflected from the mirror-coated parts of the second, third, fifth to eighth subsidiary lenses LS12, LS13, LS21, LS22, LS23 and LS24, respectively, and may be directed toward the respective inner coated parts. The inner coated parts may then reflect the image display light reflected from the respective mirror-coated parts toward the user's eyeballs on the front side.

Figure 16:
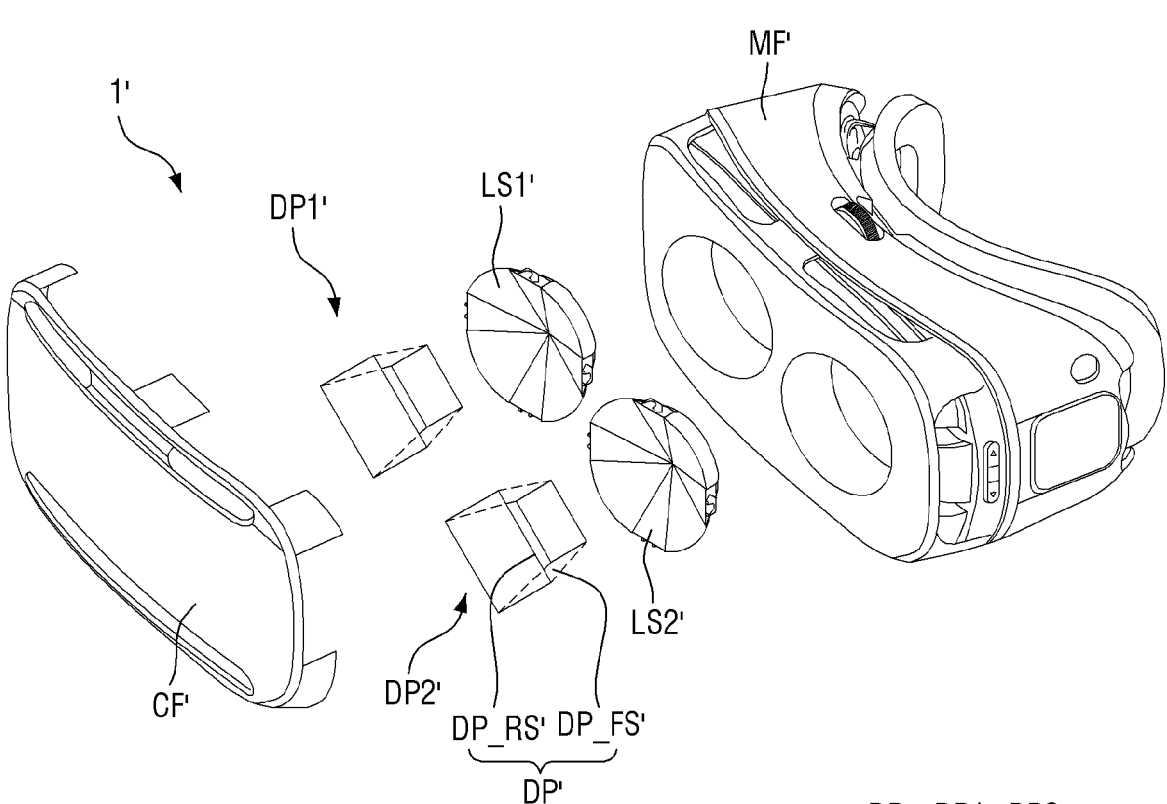
FIG. 16 is an exploded perspective view showing a display device according to an embodiment and a wearable device including the same.
Figure 17:
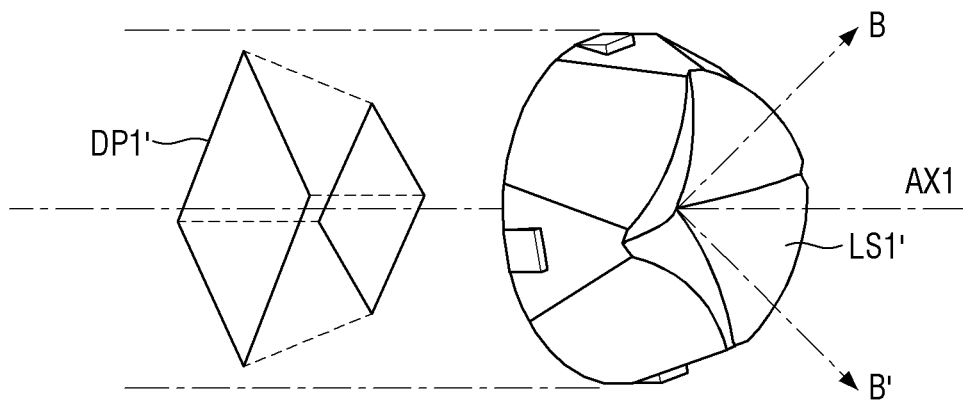
FIG. 17 is an exploded perspective view illustrating an arrangement of the display panels and the multi-channel lenses shown in FIG. 16 and a coupling structure.
Figure 17:
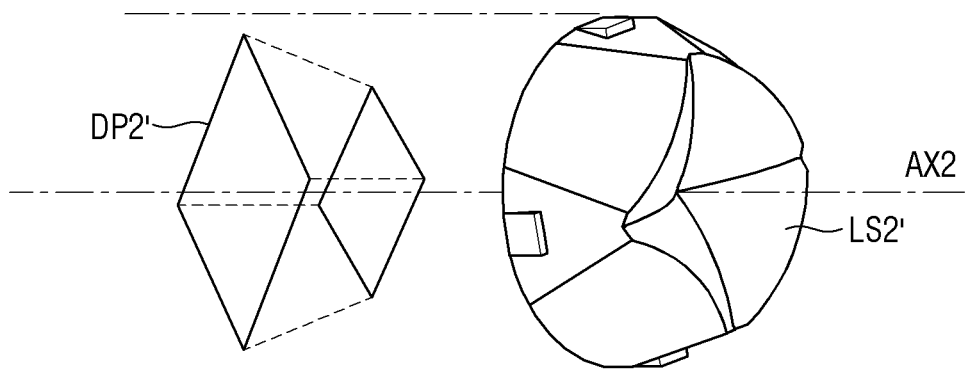
Figure 18:
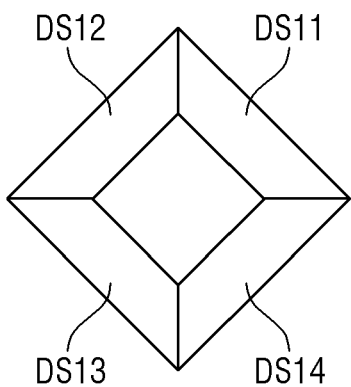
FIG. 18 is a front view of the display panels shown in FIG. 16.
Figure 18:
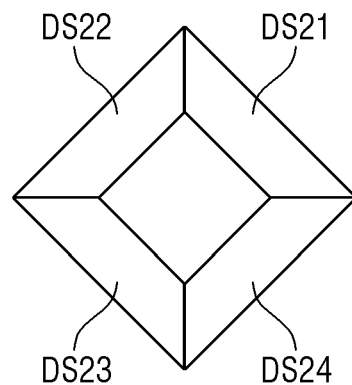

FIG. 16 is an exploded perspective view showing a display device according to an embodiment and a wearable device including the same, FIG. 17 is an exploded perspective view illustrating an arrangement of the display panels and the multi-channel lenses shown in FIG. 16 and a coupling structure thereof, and FIG. 18 is a front view of the display panels shown in FIG. 16. The embodiment of FIGS. 16 to 18 is substantially identical to the embodiment of FIGS. 2 to 8, 14 and 15 except that subsidiary display surfaces of a display panel in a display device may be extended to one another, and therefore the redundant descriptions will be omitted. Referring to FIGS. 16 to 18, the display device 10' may be a flexible display device, a folding display device, and/or a stretchable display device.

The substrate of the display device 10' may be made of, but may not be limited to, polydimethylsiloxane (PDMS). Since the PDMS has flexibility as well as elasticity, it can be applied not only to a flexible organic light-emitting display device or a folding organic light-emitting display device but also to a stretchable organic light-emitting display device. The PDMS material may contain nanocarbon tubes.

The display device 10' includes a display panel DP' for displaying images, and first and second multi-channel lenses LS1' and LS2' for forming light paths so that a user can see the image display light from the display panel DP'. The display panel DP' includes a first display panel DP1' and a second display panel DP2' and displays images and/or videos. The display panel DP' may include a front surface DP_FS' on which images and/or videos may be displayed, and a rear surface DP_RS' opposite to the front surface DP_FS'. Light for providing images and/or videos may be output from the front surface DP_FS' of the display panel DP'. As will be described later, the first and second multi-channel lenses LS1' and LS2' may be disposed on the front surface DP_FS' of the display panel DP'.

The display panel DP' may be fixed (e.g., directly fixed) to the main frame MF', or may be fixed to the main frame MF' by a separate fixing member. The display panel DP' may be opaque, transparent or translucent depending on the design of the wearable device 1', for example, the type of the wearable device 1'.

The display panel DP' may include a first display panel DP1' and a second display panel DP2' corresponding to the left and right eyes, respectively. The first display panel DP1' includes display surfaces DS11, DS12, DS13, and DS14. Images output from the display surfaces DS11, DS12, DS13 and DS14 may be extended to one another to form a single screen. An image output by the first display panel DP1' may be a left-eye image. Similarly, the second display panel DP2' includes display surfaces DS21, DS22, DS23, and DS24. Images output from the display surfaces DS21, DS22, DS23 and DS24 may be extended to one another to form a single screen. An image output by the second display panel DP2' may be a right-eye image. The display surfaces DS21, DS22, DS23 and DS24 may be disposed on different planes.

The first display panel DP1' and the second display panel DP2' may be light-emitting display panels including light-emitting elements. For example, each of the first display panel DP1' and the second display panel DP2' may be an organic light-emitting display panel using organic light-emitting diodes, a micro light-emitting diode display panel using micro LEDs, a quantum-dot light-emitting display panel using quantum-dot light-emitting diodes, or an inorganic light-emitting display panel using inorganic light-emitting elements. The first and second display panels DP1' and DP2' corresponding to the user's eyes, respectively, may be symmetrical to each other, and may have substantially the same structure. It should be understood, however, that the disclosure may not be limited thereto.

The first and second multi-channel lenses LS1' and LS2' may be disposed on front surfaces of the first and second display panels DP1' and DP2' respectively. According to the embodiment of the disclosure, the first display panel DP1' may include the first display surface DS11, the second display surface DS12, the third display surface DS13, and the fourth display surface DS14. The second display panel DP2' may include the fifth display surface DS21, the sixth display surface DS22, the seventh display surface DS23, and the eighth display surface DS24. It should be noted that the number of the display surfaces of the first and second display panels DP1' and DP2' may not be limited thereto but may vary depending on the subsidiary lenses LS11', LS12', LS13', LS14', LS21', LS22', LS23' and LS24'. The number of display surfaces of the first and second display panels DP1' and DP2' may be equal to the number of subsidiary lenses of the first and second multi-channel lenses LS1' and LS2' respectively. For example, in case that the first multi-channel lens LS1' has six subsidiary lenses, the first display panel DP1' may also have six display surfaces.

Each of the first and second display panels DP1' and DP2' may have a quadrangular frustum shape, and display surfaces correspond to the side surfaces of the quadrangular frustum. For example, the first display surface DS11, the second display surface DS12, the third display surface DS13 and the fourth display surface DS14 of the first display panel DP1' may be arranged in the counterclockwise direction with respect to the upper surface of the quadrangular frustum at the center. The first display surface DS11 and the second display surface DS12 may be adjacent to each other, and the boundary between the first display surface DS11 and the second display surface DS12, the boundary between the second display surface DS12 and the third display surface DS13 and the boundary of the third display surface DS13 and the fourth display surface DS14 become the vertexes of the frustum. Each of the display surfaces DS11, DS12, DS13, DS14, DS21, DS22, DS23 and DS24 may have, but may not be limited to, a trapezoidal shape in case of being viewed from the front. The display surfaces DS11, DS12, DS13, DS14, DS21, DS22, DS23 and DS24 may be congruent in size and shape. The corners of the frustum may overlap the corners of the subsidiary lenses, and no image may be displayed at the corners of the frustum.

The first display panel DP1' in the quadrangular frustum shape may be disposed such that its upper surface faces the center of the first multi-channel lens LS1'. The first multi-channel lens LS1' may overlap the first display panel DP1', and the first multi-channel lens LS1' may be disposed to cover the first display panel DP1'. The second display panel DP2' in the quadrangular frustum shape may be disposed such that its upper surface faces the center of the second multi-channel lens LS2'. According to the embodiment of the disclosure, since the second display panel DP2' may be substantially identical to the first display panel DP1', the description will focus on the first display panel DP1'.

The first display surface DS11, the second display surface DS12, the third display surface DS13 and the fourth display surface DS14 of the first display panel DP1' may face the first subsidiary lens LS11', the second subsidiary lens LS12', the third subsidiary lens LS13' and the fourth subsidiary lens LS14' of the first multi-channel lens LS1', respectively.

The first display surface DS11, the second display surface DS12, the third display surface DS13 and the fourth display surface DS14 of the first display panel DP1' may face the rear surfaces of the first subsidiary lens LS11', the second subsidiary lens LS12', the third subsidiary lens LS13' and the fourth subsidiary lens LS14' of the first multi-channel lens LS1', respectively. Specifically, the front surface of the first display surface DS11 overlaps the first mirror-coated part M11' (see FIG. 6) of the first subsidiary lens LS11', the front surface of the second display surface DS12 overlaps the second mirror-coated part M12' (see FIG. 6) of the second subsidiary lens LS12', the front surface of the third display surface DS13 overlaps the third mirror-coated part M13' (see FIG. 6) of the third subsidiary lens LS13', and the front surface of the fourth display surface DS14 overlaps the fourth mirror-coated part M14' (see FIG. 6) of the fourth subsidiary lens LS14'. Accordingly, the first to fourth mirror-coated parts M11', M12', M13' and M14' may reflect image display light incident from the display surfaces DS11, DS12, DS13 and DS14 respectively toward the concaved portion, which may be the center of the first multi-channel lens LS1'.

Figure 19:
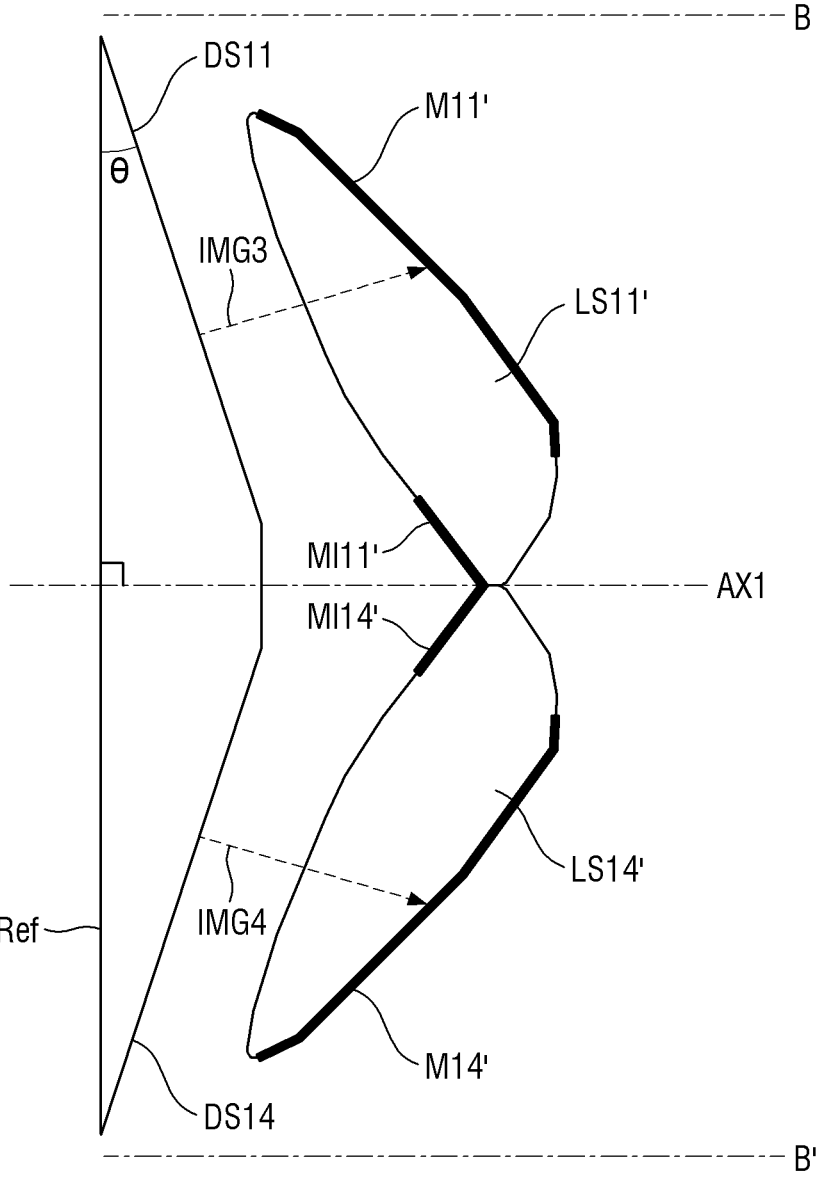
FIG. 19 is a schematic cross-sectional view of the display module taken along line B-B' of FIG. 17.
Figure 20:
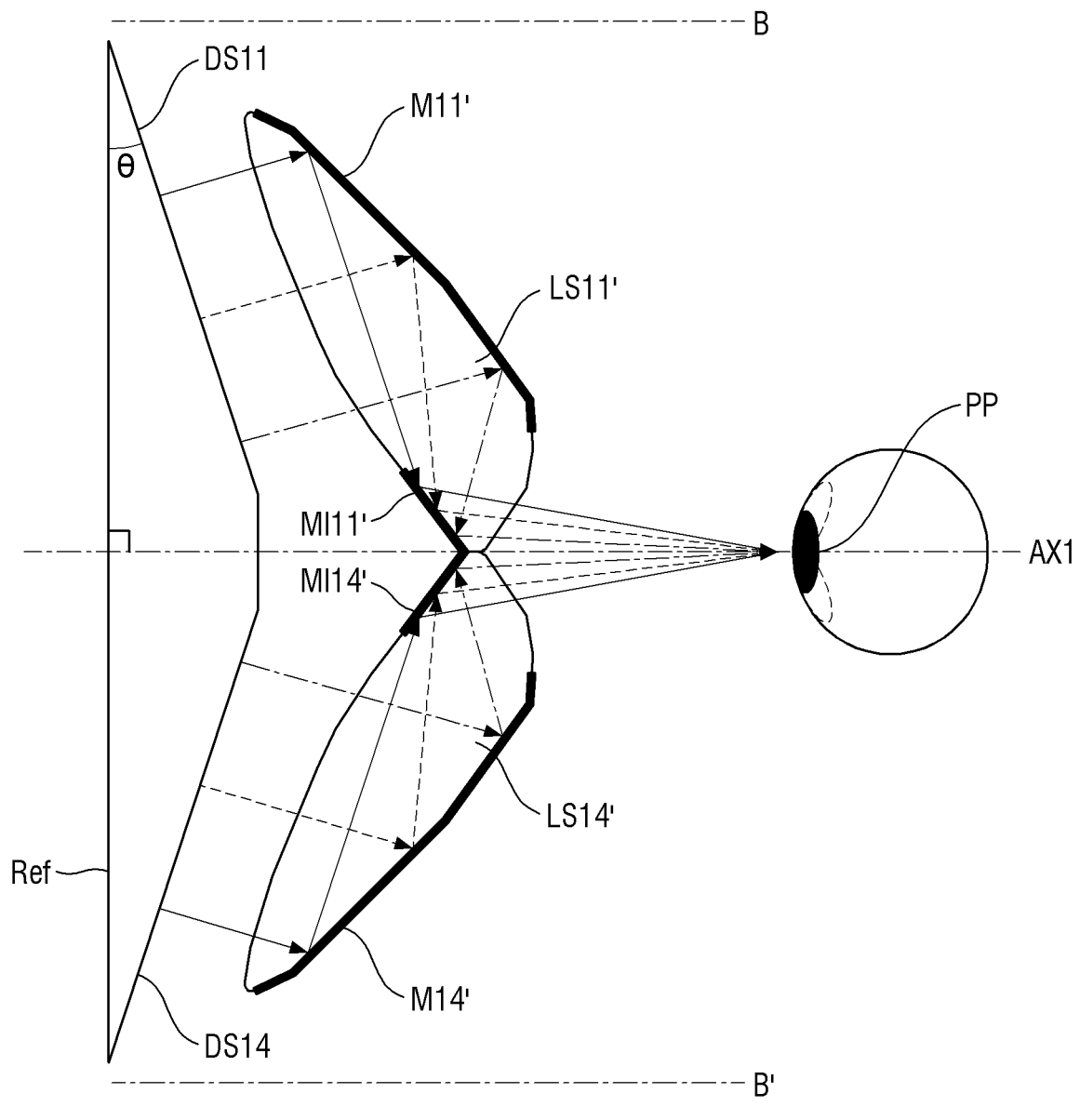
FIG. 20 is a view showing light output in the example shown in FIG. 19.

FIG. 19 is a schematic cross-sectional view of the display module, taken along line B-B' of FIG. 17, and FIG. 20 is a view showing light output in the example shown in FIG. 19. Referring to FIGS. 19 and 20, interior angles of display surfaces DS11, DS12, DS13 and DS14 of a first display panel DP1' may be inclined by a first angle $\theta$ from a reference plane Ref, and the display surfaces DS11, DS12, DS13 and DS14 may be arranged such that they face rear surfaces of subsidiary lenses LS11', LS12', LS13' and LS14', respectively. The reference plane Ref may be a virtual plane perpendicular to the optical axes AX1 and AX2 of the first and second multi-channel lenses LS1' and LS2'. In this manner, light output from the display surfaces can be incident on the multi-channel lens at about 0 degrees without generating any ghost image, so that the luminance may be the largest and the color difference effect may be the smallest. The first angle $\theta$ may be about 20 to about 30 degrees but may not be so limited as long as the angle of the chief ray incident on the subsidiary lenses LS11', LS12', LS13' and LS14' from the display surfaces DS11, DS12, DS13 and DS14 is about zero (i.e., parallel to the optical axis).

In case that a user on the front side gazes at the display images displayed by the first display panel DP1' and the second display panel DP2' through the first and second multi-channel lenses LS1' and LS2' respectively, the first display panel DP1' and the second display panel DP2' display the display images on the left and right eye image display surfaces toward the user's pupils PP. Specifically, the subsidiary lenses LS11', LS12', LS13', LS14', LS21', LS22', LS23' and LS24' disposed on the first and second multi-channel lenses LS1' and LS2' provide channels through which light output from the front surface DP_FS' of the display surfaces DS11, DS12, DS13, DS14, DS21, DS22, DS23 and DS24 pass. Image display light output from the front surface DP_F' of each of the display surfaces DS11, DS12, DS13, DS14, DS21, DS22, DS23 and DS24 may pass through different channels. Herein, each image display light may include partial video and/or partial image for forming one complete VR image.

For example, as shown in FIG. 19, the first subsidiary lens LS11 may provide a channel through which the image display light IMG3 output from the first display surface DS11 passes, and the fourth subsidiary lens LS14' may provide a channel through which the image display light IMG4 output from the fourth display surface DS14 passes. Similarly, although not shown in the drawings, the second subsidiary lens LS12' and the third subsidiary lens LS13' may provide channels through which light output from the second display surface DS12 and the third display surface DS13 pass, respectively.

According to the embodiment of the disclosure, the image display light passing through the subsidiary lens LS11', LS12', LS13', LS14', LS21', LS22', LS23' and LS24' may be provided to the user after they have been reflected twice, once by the first to fourth mirror-coated parts M11', M12', M13' and M14' and another time by the first to fourth inner coated parts MI11', MI12', MI13' and MI14'. It should be understood, however, that the disclosure may not be limited thereto.

As shown in FIG. 20, the interior angles of the first display surface DS11 and the fourth display surface DS14 have the first angle $\theta$ from the reference surface Ref. Accordingly, light output from the first display surface DS11 and the fourth display surface DS14 may not be directed toward the rear surfaces of the first to fourth inner coated-parts MI11', MI12', MI13' and MI14'. Accordingly, the image display light output from the first display surface DS11 may be reflected by the first mirror-coated part M11' of the first subsidiary lens LS11' and directed to the first inner coated part MI11'. The first inner coated part MI11' may then reflect the image display light reflected from the first mirror-coated part M11' toward the user's eyeball on the front side. Similarly, the image display light output from the fourth display surface DS14 may be reflected by the fourth mirror-coated part M14' of the fourth subsidiary lens LS14' and directed to the fourth inner coated part MI14'. The fourth inner coated part MI14' may then reflect the image display light reflected from the fourth mirror-coated part M14' toward the user's eyeball on the front side. The image display light output from the second, third, fifth to eighth display surfaces DS12, DS13, DS21, DS22, DS23 and DS24, which may not be shown in FIG. 20, may be reflected from the mirror-coated parts of the second, third, fifth to eighth subsidiary lenses LS12', LS13', LS21', LS22', LS23' and LS24', respectively, and may be directed toward the respective inner coated parts. The inner coated parts may then reflect the image display light reflected from the respective mirror-coated parts toward the user's eyeballs on the front side.

According to the above-described embodiments, it may be possible to prevent image display defects such as a ghost image in the display device, and it may be possible to improve the luminance and suppress chromatic aberration by adjusting the angle of the chief ray of the display panel to about 0 degrees.

However, the aspects of the disclosure may not be restricted to the one set forth herein. The above and other aspects of the disclosure will become more apparent to one of daily skill in the art to which the disclosure pertains by referencing the claims, with functional equivalents thereof to be included therein.

What is claimed is:

1. A display device defining an axial direction, the display device comprising:
   at least one display panel, each of which is configured to correspond to a respective eye of a user, the at least one display panel comprising a plurality of subsidiary display panels, wherein image display light output from the plurality of subsidiary panels are extended to one another to form a single screen image; and at least one multi-channel lens comprising a plurality of subsidiary lenses that provide a corresponding plurality of channels through which the image display light output from the plurality of subsidiary display panels may pass, respectively, wherein the plurality of subsidiary display panels are associated with the plurality of subsidiary lenses, respectively, the plurality of subsidiary display panels are inclined at a first angle with respect to a reference plane so that front surfaces of the plurality of subsidiary display panels face the respective plurality of subsidiary lenses, and the plurality of subsidiary display panels are disposed to face rear surfaces of the respective plurality of subsidiary lenses, and emit the image display light toward the rear surfaces of the plurality of subsidiary lenses so that an angle of a chief ray is about 0 degrees, no imposing configuration is disposed between the at least one display panel and the at least one multi-channel lens, each of the plurality of subsidiary lenses comprises a light entry surface through which the image display light enters and a light exiting surface from which the image display light exits, the light exiting surface extending in a convex curve from a radially central portion to a radially outer portion such that the radially central portion of the light exiting surface extends farther in the axial direction towards the at least one display panel than a remainder of the light exiting surface, and a first subsidiary display panel of the plurality of subsidiary display panels is spaced apart from a second subsidiary display panel of the plurality of subsidiary display panels along a first direction and spaced apart from a third subsidiary display panel of the plurality of subsidiary display panels along a second direction, the first and second directions being orthogonal to each other and orthogonal to the axial direction.

2. The display device of claim 1, wherein the reference plane is a horizontal plane perpendicular to an optical axis of the at least one multi-channel lens.

3. The display device of claim 1, wherein a front surface of each of the plurality of subsidiary lenses comprises the light entry surface and a mirror-coated part on which a reflective material is disposed.

4. The display device of claim 3, wherein the at least one multi-channel lens comprises a concaved portion at a center of the at least one multi-channel lens, and the concaved portion comprises an inner coated part where the reflective material is disposed.

5. The display device of claim 4, wherein the mirror-coated part reflects the image display light output from each of the plurality of subsidiary display panels toward the inner coated part.

6. The display device of claim 5, wherein the inner coated part reflects the image display light reflected from the mirror-coated part in a direction of an optical axis of the lens.

7. The display device of claim 1, wherein ones of the plurality of subsidiary lenses are spaced apart from one another.

8. The display device of claim 3, wherein each of the plurality of subsidiary display panels overlap a corresponding mirror-coated part.

9. The display device of claim 1, wherein the at least one multi-channel lens comprises a first multi-channel lens and a second multi-channel lens disposed in line with a first display panel and a second display panel, respectively, and the first and the second multi-channel lenses pass the image display light output from the first display panel and the second display panel respectively through different paths corresponding to the plurality of channels to transmit the image display light to a user's eyes through the plurality of channels having different paths.

10. The display device of claim 9, wherein the at least one display panel comprises the first display panel and the second display panel disposed at positions corresponding to positions of the user's left and right eyes, respectively.

11. A display device defining an axial direction, the display device comprising:

at least one display panel, each of which is configured to correspond to a respective eye of a user, the at least one display panel comprising a plurality of display surfaces disposed on different planes, wherein image display light output from the display surfaces are extended to one another to form a single screen image; and at least one multi-channel lens comprising a plurality of subsidiary lenses that provide a corresponding plurality of channels through which the image display light output from the plurality of display surfaces may pass, respectively, wherein the plurality of display surfaces are associated with the plurality of subsidiary lenses, respectively, and the plurality of display surfaces are inclined at a first angle with respect to a reference plane to face the respective plurality of subsidiary lenses, the display panel is shaped as a frustum, the plurality of display surfaces are disposed on side surfaces of the frustum, and the plurality of display surfaces face rear surfaces of the respective plurality of subsidiary lenses, and emit the image display light toward the rear surfaces of the plurality of subsidiary lenses so that an angle of a chief ray is about 0 degrees, no imposing configuration is disposed between the at least one display panel and the at least one multi-channel lens, each of the plurality of subsidiary lenses comprises a light entry surface through which the image display light enters and a light exiting surface from which the image display light exits, the light exiting surface extending in a convex curve from a radially central portion to a radially outer portion such that the radially central portion of the light exiting surface extends farther in the axial direction towards the at least one display panel than a remainder of the light exiting surface.

12. The display device of claim 11, wherein the reference plane is a horizontal plane perpendicular to an optical axis of the at least one multi-channel lens.

13. The display device of claim 11, wherein the plurality of display surfaces are disposed to face rear surfaces of the plurality of respective subsidiary lenses, and emit image display light toward the rear surfaces of the plurality of subsidiary lenses so that an angle of a chief ray is about 0 degrees.

14. The display device of claim 13, wherein a front surface of each of the plurality of subsidiary lenses comprises a mirror-coated part on which a reflective material is disposed.

15. The display device of claim 14, wherein the at least one multi-channel lens comprises a concaved portion at a center of the at least one multi-channel lens, and the concaved portion comprises an inner coated part where the reflective material is disposed.

16. The display device of claim 15, wherein
the mirror-coated part reflects the image display light output from each of the plurality of display surfaces to the inner coated part, and
the inner coated part reflects the image display light reflected from the mirror-coated part in a direction of an optical axis of the lens.

17. The display device of claim 16, wherein each of the display surfaces overlaps a corresponding mirror-coated part.

18. A wearable device comprising:
a main frame configured to be mounted on a user's body;
a display device mounted on the main frame to display an image; and
a cover frame covering the display device, wherein
the display device defines an axial direction and comprises:
    at least one display panel, each of which is configured to correspond to a respective eye of a user, the at least one display panel comprising a plurality of subsidiary display panels, wherein image display light output from the subsidiary panels are extended to one another to form a single screen image; and
    at least one multi-channel lens comprising a plurality of subsidiary lenses that provide a corresponding plurality of channels through which the image display light output from the plurality of subsidiary display panels may pass, respectively,
the plurality of subsidiary display panels are associated with the plurality of subsidiary lenses, respectively,
the plurality of subsidiary display panels are inclined at a first angle with respect to a reference plane so that display surfaces of the plurality of subsidiary display panels face the respective plurality of subsidiary lenses, and
the plurality of subsidiary display panels are disposed to face rear surfaces of the respective plurality of subsidiary lenses, and emit the image display light toward the rear surfaces of the plurality of subsidiary lenses so that an angle of a chief ray is about 0 degrees,
no imposing configuration is disposed between the at least one display panel and the at least one multi-channel lens,
each of the plurality of subsidiary lenses comprises a light entry surface through which the image display light enters and a light exiting surface from which the image display light exits, the light exiting surface extending in a convex curve from a radially central portion to a radially outer portion such that the radially central portion of the light exiting surface extends farther in the axial direction towards the at least one display panel than a remainder of the light exiting surface, and
a first subsidiary display panel of the plurality of subsidiary display panels is spaced apart from a second subsidiary display panel of the plurality of subsidiary display panels along a first direction and spaced apart from a third subsidiary display panel of the plurality of subsidiary display panels along a second direction, the first and second directions being orthogonal to each other and orthogonal to the axial direction.

19. A wearable device comprising:
a main frame configured to be mounted on a user's body;
a display device mounted on the main frame to display an image; and
a cover frame covering the display device, wherein
the display device defines an axial direction and comprises:
    at least one display panel, each of which is configured to correspond to a respective eye of a user, the at least one display panel comprising a plurality of display surfaces disposed on different planes, wherein image display light output from the plurality of display surfaces are extended to one another to form a single screen image; and
    at least one multi-channel lens comprising a plurality of subsidiary lenses that provide a corresponding plurality of channels through which the image display light output from the plurality of display surfaces may pass, respectively,
the plurality of display surfaces are associated with the plurality of subsidiary lenses, respectively,
the plurality of display surfaces are inclined at a first angle with respect to a reference plane to face the respective plurality of subsidiary lenses, and
the plurality of display surfaces face rear surfaces of the respective plurality of subsidiary lenses, and emit the image display light toward the rear surfaces of the plurality of subsidiary lenses so that an angle of a chief ray is about 0 degrees,
no imposing configuration is disposed between the at least one display panel and the at least one multi-channel lens,
each of the plurality of subsidiary lenses comprises a light entry surface through which the image display light enters and a light exiting surface from which the image display light exits, the light exiting surface extending in a convex curve from a radially central portion to a radially outer portion such that the radially central portion of the light exiting surface extends farther in the axial direction towards the at least one display panel than a remainder of the light exiting surface,
the display panel is shaped as a frustum, and
the plurality of display surfaces are disposed on side surfaces of the frustum.

20. The display device of claim 1, wherein the image display light emanating from the plurality of subsidiary display panels is perpendicularly incident onto rear surfaces of the respective ones of the plurality of subsidiary lenses.

21. The display device of claim 1, wherein ones of the plurality of subsidiary display panels face in different directions.

* * * * *